(12) United States Patent
Bachmann et al.

(10) Patent No.: US 7,756,342 B2
(45) Date of Patent: Jul. 13, 2010

(54) METHOD FOR IMAGE DATA PROCESSING

(75) Inventors: Charles M Bachmann, Burke, VA (US); Thomas L Ainsworth, Burke, VA (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 1240 days.

(21) Appl. No.: 11/239,447

(22) Filed: Sep. 20, 2005

(65) Prior Publication Data

US 2006/0251324 A1    Nov. 9, 2006

Related U.S. Application Data

(60) Provisional application No. 60/612,394, filed on Sep. 20, 2004.

(51) Int. Cl.
   *G06K 9/62* (2006.01)
(52) U.S. Cl. .......................... 382/224; 356/303; 283/91
(58) Field of Classification Search ................ 382/100, 382/181, 190, 191, 224, 225; 707/1; 356/303; 283/91
   See application file for complete search history.

(56) References Cited

OTHER PUBLICATIONS

Tenenbaum, A global geometric framework for nonlinear dimensionality reduction, 2000, IEEE, vol. 290, pp. 2319-2323.*
Chang, Further investigations into the use of linear and nonlinear mixing models for hyperspectral image analysis, 2002, SPIE, vol. 4725, pp. 157-167.*
Mukund Balasubramanian et al, "The Isomap Algroithm and Topological Stability", Science, vol. 295, 7a pp. 1-3, Jan. 4, 2202.
T.L. Ainswork et al, "Optimal Polarimetric Decomposition Variables—Non-Linear Dimensionality Reduction", IEEE Trans., pp. 928-930, 2001.
Peter N. Yianilos, "Data Structures and Algorithms for Nearest Neighbor Search in General Metric Spaces", NEC Research Institute, 4 Independence Way, Princeton, New Jersey 08540, pp. 1-11.
T.L. Ainsworth et al, "Optimal Image Classification Employing [Optimal] Polarimetric Variables", IEEE Trans. 2003 pp. 696-698.

(Continued)

*Primary Examiner*—Anand Bhatnagar
(74) *Attorney, Agent, or Firm*—Amy L. Ressing; Kerry Broome

(57) ABSTRACT

A method for exploiting the nonlinear structure of hyperspectral imagery employs a manifold coordinate system that preserves geodesic distances in the high-dimensional hyperspectral data space. Data representing physical parameters such as a scene is divided into a set of smaller tiles. The manifolds derived from the individual tiles are then aligned and stitched together to complete the scene. Coordinates are derived for a very large although not complete representative subset of the data termed the "backbone". Manifold coordinates are derived for this representative backbone and then the remaining samples inserted into the backbone using a reconstruction principle using the property of local linearity everywhere on the manifold to reconstruct the manifold coordinates for the samples not originally belonging to the backbone. The output is a global manifold coordinate system, which for topographical image data depicts clearer detail of land and water portions of a scene.

22 Claims, 12 Drawing Sheets

OTHER PUBLICATIONS

Dimitris K. Agrafiotis et al, "A Self-Organizing Principle for Learing Nonlinear Manifolds", 3-Dimensional Pharmaceuticals, Inc., vol. 99, No. 25, pp. 15869-15872, Dec. 10, 2002.

Chein-1 Chang et al, "Anomaly Detection and Classification for Hyperspectral Imagery", IEE Trans, Geoscience and Remote Sensing, vol. 40, No. 6, pp. 1314-1325, Jun. 2002.

Vin de Silva et al, "Global Versus Local Methods in Nonlinear Dimensionality Reduction", pp, 1-8.

Kerri J. Guilfoyle at al, "Further Investigations into the Use of Linear and Nonlinear Mixing Models for Hyperspectral Image Analysis", SPIE, vol. 4725, pp. 157-167, 2002.

J. Bowles et al, Use of Filter Vectors in Hyperspectral Data Analysis, SPIE, vol. 2553, pp. 148-157.

F.A. Kruse et al, "The Spectral Image Processing System (SIPS)—Interfactive Visualization and Analysis of Imaging Spectrometer Data", Elsevier Science, pp, 145-163, 1993.

D.A. Roberts, Green Vegetation, Nonphotosynthetic Vegetation, and Soils in Aviris Data, Elsevier Science, pp. 255-269, 1993.

Sam T. Rowels et al, "Nonlinear Dimensinality Reduction by Locally Linear Embedding", Science, vol. 290, pp. 2323-2326, Dec. 22, 2000.

Joshua B. Tenenbaum et al, A Global Geometric Framework for Nonlinear Dimensionality Reduction, Science, vol. 290, pp. 2319-2322, Dec. 22, 2000.

Micahael M. Verstraete et al, "Designing Optimal Spectral Indexes for Remote Sensing Applications", IEEE Trans, pp, 1254-1265, 1996.

F, Van Der Meer, Iterative Specgtral UnMixing (ISU), International Journal of Remote Sensing, vol. 20:17, pp. 3431-3436, Nov. 15, 1999.

* cited by examiner

METHOD FOR IMAGE DATA PROCESSING

The present application claims the benefit of the priority filing date of provisional patent application No. 60/612,394, filed Sep. 20, 2004, incorporated herein by reference.

FIELD OF THE INVENTION

This invention relates to a method and device for processing data such as hyperspectral imaging data. More particularly, the invention relates to a manifold representation technique applied to the nonlinear structure of hyperspectral imagery.

BACKGROUND OF THE INVENTION

For many years, linear mixing, for example as described in J. W. Boardman, "Automating spectral unmixing of AVIRIS data using convex geometry concepts," in Proc. 4th Annu. JPL Airborne Geosciences Workshop, vol. 1, Pasadena, Calif., 1993, JPL Pub. 93-26, pp. 11-4. and "best band" combinations have been de facto standards in the analysis of spectral data, especially hyperspectral. The "best band" approach, for example as described in R. N. Clark, G. A. Swayze, C. Koch, A. Gallagher, and C. Ager, "Mapping vegetation types with the multiple spectral feature mapping algorithm in both emission and absorption," in Summaries of the 3rd Annual JPL Airborne Geosciences Workshop, vol. 1, 1992, AVIRIS Workshop, JPL Pub. 92-14, pp. 60-62, relies on the presence of narrowband features that may be characteristic of a particular category of interest or on known physical characteristics of broad classes of data, e.g., vegetation indices, as described in "Designing optimal spectral indexes for remote sensing applications," M. M. Verstraete and B. Pinty, *IEEE Trans. Geosci. Remote Sens.*, vol. 34, no. 5, pp. 1254-1264, September 1996. On the other hand, the underlying assumption of linear mixing is that each pixel in a scene may be decomposed into a finite number of constituent endmembers, which represent the purest pixels in the scene. A number of algorithms have been developed and have become standards; these include the pixel purity index (PPI), described in "Mapping target signatures via partial unmixing of AVIRIS data," J. W. Boardman, F. A. Kruse, and R. O. Green, Summaries 5th JPL Airborne Earth Science Workshop, vol. 1, 1995, JPL Pub. 95-1, pp. 23-26, ORASIS, described in J. Bowles, P. Palmadesso, J. Antoniades, M. Baumback, and L. J. Rickard, "Use of filter vectors in hyperspectral data analysis," Proc. SPIE, vol. 2553, pp. 148-157, 1995., N-Finder, described in "Fast autonomous spectral endmember determination in hyperspectral data," M. E. Winter, Proc. 13th Int. Conf. Applied Geologic Remote Sensing, vol. 11, Vancouver, BC, Canada, 1999, pp. 337-344, and iterative spectral unmixing, described in "Iterative spectral unmixing," F. Van Der Meer, Int. J. Remote Sens., vol. 20, no. 17, pp. 3431-3436, 1999.

Although the use of endmembers and indexes based on narrowband features have yielded very useful results, these approaches largely ignore the inherent nonlinear characteristics of hyperspectral data. There are multiple sources of nonlinearity. One of the more significant sources, especially in land-cover classification applications, stems from the nonlinear nature of scattering as described in the bidirectional reflectance distribution function (BRDF) (S. R. Sandmeier, E. M. Middleton, D. W. Deering, and W. Qin, "The potential of hyperspectral bidirectional reflectance distribution function data for grass canopy characterization," J. Geophys. Res., vol. 104, no. D8, pp. 9547-9560, April 1999.). In land-cover applications, BRDF effects lead to variations in the spectral reflectance of a particular category as a function of position in the landscape, depending on the local geometry. Factors that play a role in determining BRDF effects include the optical characteristics of the canopy, canopy gap function, leaf area index (LAI), and leaf angle distribution (LAD), described in "The potential of hyperspectral bidirectional reflectance distribution function data for grass canopy characterization," S. R. Sandmeier, E. M. Middleton, D. W. Deering, and W. Qin, J. Geophys. Res., vol. 104, no. D8, pp. 9547-9560, April 1999, in which it has also been observed that wavelengths with the smallest reflectance exhibit the largest nonlinear variations. Another source of nonlinearity, especially in coastal environments such as coastal wetlands, arises from the variable presence of water in pixels as a function of position in the landscape. Water is an inherently nonlinear attenuating medium. Other effects that contribute to nonlinearities include multiple scattering within a pixel and the heterogeneity of subpixel constituents (D. A. Roberts, M. O. Smith, and J. B. Adams, "Green vegetation, non-photosynthetic vegetation, and soils in AVIRIS data," Remote Sens. Environ., vol. 44, pp. 255-269, 1993.). In some instances, nonlinear interactions have been modeled explicitly (K. Guilfoyle, M. L. Althouse, and C.-I. Chang, "Further investigations into the use of linear and nonlinear mixing models for hyperspectral image analysis," Proc. SPIE, vol. 4725, pp. 157-167, 2002). Recently, a number of papers that address the problem of modeling nonlinear data structure have appeared in the statistical pattern recognition literature. These approaches represent an attempt to derive a coordinate system that resides on (parameterizes) the nonlinear data manifold itself and are all data-driven algorithms, not physical or phenomenological models. Nevertheless, they are a very powerful new class of algorithms that can be brought to bear on many high-dimensional applications that exhibit nonlinear structure, e.g., the analysis of remote sensing imagery (T. L. Ainsworth and J. S. Lee, "Optimal image classification employing optimal polarimetric variables," in Proc. IGARSS, vol. 2, Toulouse, France, 2003, pp. 696-698). One of the first of these approaches to appear— isometric mapping (ISOMAP), described in "A global geometric framework for nonlinear dimensionality reduction," J. B. Tenenbaum, V. de Silva, and J. C. Langford, *Science*, vol. 290, pp. 2319-2323, December 2000, ("Tenenbaum et al."), incorporated herein by reference determines a globally optimal coordinate system for the nonlinear data manifold, but it is only practical for small datasets because the dominant computation is based on a determination of all pairwise distances and minimal path distances between all points, which scales as $N^3$. Equivalently, we will subsequently say that the scaling is "of order $N^3$" which we will denote by the symbol $O(N^3)$ here and in similar expressions throughout this patent application. Here N is the number of data samples (in our case, the number of pixels in a hyperspectral scene or subset). A subsequent paper, "The ISOMAP algorithm and topological stability," M. Balasubramanian, E. L. Schwartz, J. B. Tenenbaum, V. de Silva, and J. C. Langford, *Science*, vol. 295, no. 5552, p. 7a, January 2002 ("The ISOMAP algorithm"), showed that the computational scaling can be improved to $O(N^2 \log(N))$, using Dijkstra's algorithm (R. Sedgewick, Algorithms in C++, Part 5: Graph Algorithms. Reading, Mass.: Addison-Wesley, 2002) incorporated herein by reference. Another significant computational challenge is that ISOMAP memory requirements scale as $O(N^2)$, because ISOMAP requires the extraction of dominant eigenvectors of an N×N geodesic distance matrix.

An alternative approach, local linear embedding (LLE) (S. T. Roweis and L. K. Saul, "Nonlinear dimensionality reduction by locally linear embedding," Science, vol. 290, no. 5500, pp. 2323-2326, December 2000) describes the manifold by modeling each data point as a linear combination of its neighbors; this approach exploits the fundamental property that a manifold is locally linear. Like ISOMAP, it defines a neighborhood in terms of an absolute distance scale, or in terms of number of neighbors, where linearity is expected to be true. An embedding is determined by noting that the same geometric properties of neighborhood reconstruction should apply equally well to an embedded lower dimensional description up to an affine transformation (translation, rotation, and rescaling). Like the Dijkstra implementation of ISOMAP, the largest computational operations in LLE also scale as $O(N^2 \log(N))$, however, LLE is not guaranteed to discover the optimal global coordinate system and appears to be more vulnerable to noise (see response of Tenenbaum, de Silva, and Langford in "The ISOMAP algorithm"). The fastest available approach for estimating manifold coordinates is stochastic proximity embedding (SPE) (D. K. Agrafiotis and H. Xu, "A self-organizing principle for learning nonlinear manifolds," Proc. Nat. Acad. Sci., vol. 99, no. 25, pp. 15 869-15 872, December 2002.) because its fundamental computational burden scales as $O(N)$; however, the simplifying assumptions that appear in estimating geodesic distances and the embedded approximation appear to be too weak and have lead to degenerate solutions when applied to hyperspectral data and even in some very simple, artificial problems.

Manifold Coordinate Systems and Hyperspectral Data

There are a number of sources of nonlinearities in hyperspectral data: BRDF, nonlinear media such as water, multiple scattering, and the heterogeneity of pixels. In a hyperspectral scene containing natural vegetation, the nonlinear characteristics are immediately apparent in many three-channel scatterplots. FIG. 1 illustrates this point, showing three-channel scatter plots from two subsets of a 124-channel PROBE2 hyperspectral scene. Choosing any three channels will provide a different view of the high-dimensional data manifold. It would therefore be desirable to derive a coordinate system that resides on (parameterizes) the data manifold itself, following its intricate and convoluted structure with the hope of achieving a better data representation for classification and/or compression purposes. FIG. 1 also illustrates this. When estimating geodesic distances, the distance metric is only applied in a small, locally linear neighborhood. Distances to samples outside the local neighborhood of a particular sample are calculated by linking the shortest paths through points common to more than one neighborhood. Therefore, one other commonly used metric, the Mahalanobis distance, which is frequently applied in classification and detection problems in hyperspectral imagery analysis, described in "Anomaly detection and classification for hyperspectral imagery," C.-I Chang and S. Chiang, *IEEE Trans. Geosci. and Remote Sens.*, vol. 40, no. 6, pp. 1314-1325, Jun. 2002, cannot be applied in the context that is often used. Because the Mahalanobis distance implies the calculation of an associated scene covariance matrix, its use would require aggregation of samples that are not within the linear region of the manifold. The only way to apply it within the context of geodesic distance estimation would be to restrict the covariance matrix to those pixels lying within the locally linear neighborhood of a given pixel and producing a neighborhood covariance matrix for each point. While this is possible, it is certainly more computationally expensive. Since the distance metric is only evaluated locally, and far away geodesic distances are calculated using graph algorithms, the specific choice of local metric is less important.

Owing to the computational scaling of ISOMAP with image size that is at best, $O(N^2 \log(N))$, there is a need for either faster processing hardware, or a better, more computationally efficient set of algorithms. In particular, using the prior art algorithms, it is not be possible to develop a general set of manifold coordinates for entire scenes of size $O(10^6)$ samples or greater, regardless of improvements in processor hardware. Manifold coordinate representations of large hyperspectral images, $O(10^6)$ pixels, is not computationally feasible with present techniques.

SUMMARY OF THE INVENTION

According to the invention, a method of optimizing a data classification for data representative of one or more physical parameters comprises obtaining a first data set including a plurality of the data representative of the one or more physical parameters; dividing the data set into a plurality of data sets smaller than the first data set; calculating a manifold coordinate system for each of the data sets in the plurality of data sets by computing a shortest geodesic distance on a manifold between each neighboring pair of data points in the plurality of data; and for each iteration of the computation of the shortest geodesic distance, relaxing all remaining neighbors of the pair of data points that satisfy the shortest geodesic distance computation to thereby remove the remaining data points such that each data point satisfying the shortest geodesic distance is established to thereby obtain an optimized data classification set of the data representative of the physical parameters.

Also according to the invention, a method of optimizing the data classification comprises obtaining a first data set including a plurality of the data representative of the one or more physical parameters; dividing the data set into a plurality of data sets smaller than the first data set; calculating a manifold coordinate system for each of the data sets in the plurality of data sets by computing a shortest geodesic distance on a manifold between each neighboring pair of data points in the plurality of data; computing vantage point forests at a selected distance metric r; sorting N samples into neighborhoods by querying the vantage point forests; connecting substantially all N samples to a landmark on a final geodesic distance graph to substantially eliminate isolated data points; estimating geodesic distances from the N samples to L landmarks to form an L×N landmarks geodesic distance matrix; extracting q eigenvalue-eigenvector pairs from a second order variation of an L×L sub-matrix of the L×N landmarks geodesic distance matrix; and for each point that is not a landmark point projecting a vector of geodesic distances from each landmark computed in the vantage point forest computation step onto the q eigenvectors to obtain q manifold coordinates, thereby obtaining an optimized data classification set of the data representative of the physical parameters.

In another embodiment, the invention comprises obtaining a first backbone data set extracted from a larger full scene data set including a plurality of data in the first data set representative of a typical within-scene variation and representative of the one or more physical parameters; dividing the remaining data not in the backbone into a set of smaller subsets; calculating a manifold coordinate system for each of the subset data sets in the plurality of data sets by computing a shortest geodesic distance on a manifold between each neighboring pair of data points in the plurality of data; and deriving manifold coordinates for remaining points not in the backbone data set via a reconstruction principle to thereby obtain an optimized data classification set of the data representative of the physical parameters.

In yet another embodiment, the invention comprises obtaining a first backbone data set extracted from a larger full scene data set including a plurality of data in the first data set representative of a typical within-scene variation and representative of the one or more physical parameters, calculating a manifold coordinate system for all of the remaining data not in the backbone by computing a shortest geodesic distance on a manifold between each neighboring pair of data points in the backbone containing the plurality of data; and deriving manifold coordinates for remaining points not in the backbone data set via a reconstruction principle to thereby obtain an optimized data classification set of the data representative of the physical parameters.

Each of the improvements and new algorithms that we have developed leads to lower computational and memory cost making a solution possible for large scale hyperspectral scenes. In particular, because of the improved classification performance and compression possible with manifold coordinate representations, the development of a scene-level manifold coordinate product has important ramifications for many DOD and civilian applications where hyperspectral imagery is widely used.

Additional features and advantages of the present invention will be set forth in, or be apparent from, the detailed description of preferred embodiments which follows.

DETAILED DESCRIPTION OF THE PREFERRED EMBODIMENTS

Manifolds

Formal Definitions

Figure 1:
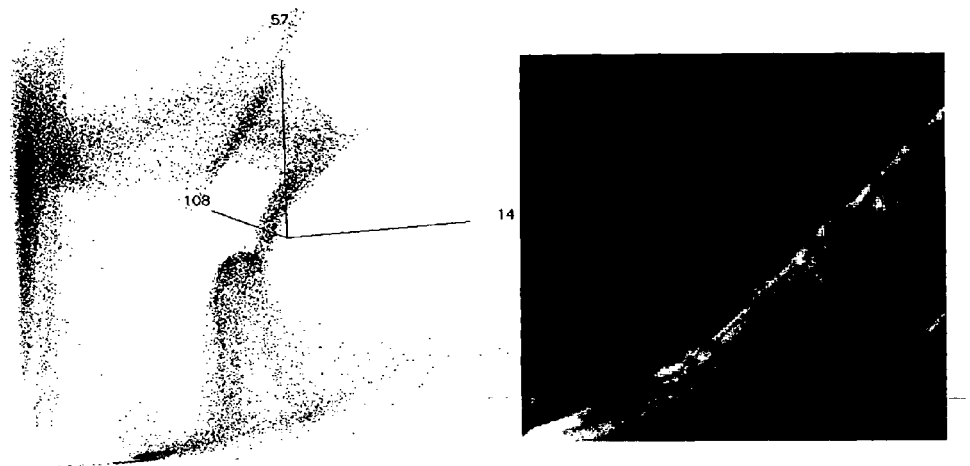
FIG. 1 (Top left) is a scatter plot, top right a subset, (Middle right) a Conceptual view of a manifold coordinate system that resides on (parametrizes) the manifold according to the invention, (middle left) are typical endmembers found by convex hull analysis, (Bottom left) a Lagoonal region in same scene with subtidal flat outlined, (Bottom middle) Enlargement of the subtidal zone, and (bottom right) a scatterplot showing distribution with curvature.
Figure 1:
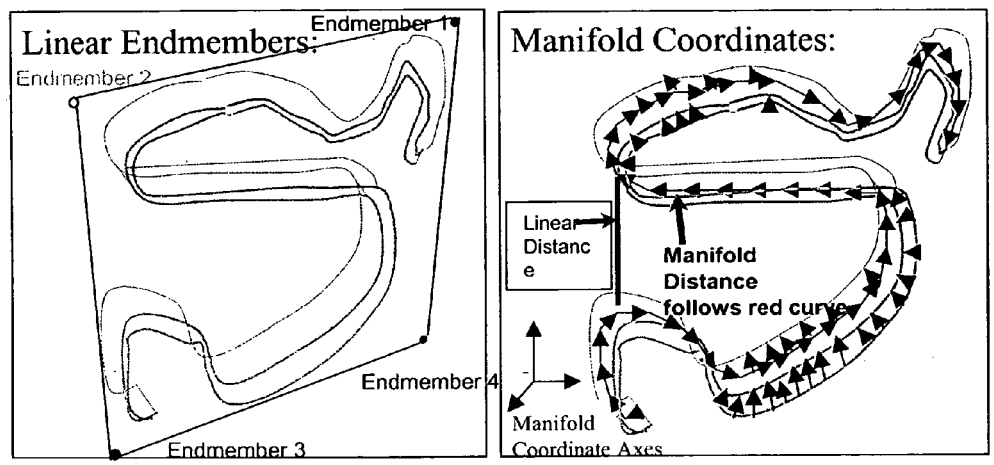
Figure 1:
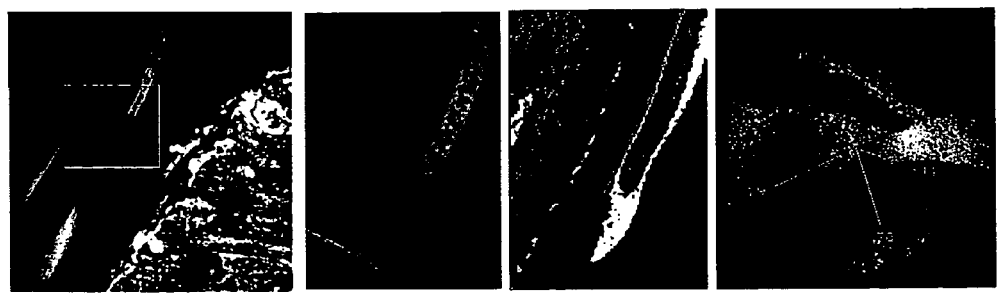

Either explicitly or implicitly, the most fundamental property that is usually exploited in manifold algorithms is that locally a manifold looks like a Euclidean space. This is essentially what is meant by the definition of a "d-dimensional topological manifold," where, formally, we require that for each point $\bar{x}$ in the manifold M, there is an open subset V with $\bar{x} \in V$, for which there exists a homeomorphic mapping g that maps V into a d-dimensional open subset V' in a d-dimensional Euclidean space $\Re^d$ $$V \xrightarrow{g} V' \tag{1}$$

It is this open subset V that we identify as the "neighborhood" in algorithms described herein.

ISOMAP

Of the extant methods for estimating a global manifold coordinate system, ISOMAP is the only one for which a globally optimal solution can be guaranteed. In the original ISOMAP, all Euclidean distances $r_{ij}$ between pairs of data sample points $\bar{x}_i$ and $\bar{x}_j$ are calculated. Using the notation in Tenenbaum et al., a connected graph of distances $d_G(i,j)$ is first determined. Whenever samples $\bar{x}_i$ and $\bar{x}_j$ lie within a neighborhood defined by an absolute distance scale $\epsilon$ ($\epsilon$-ISOMAP) or by a set of K nearest neighbors (K-ISOMAP), $d_G(i,j) = r_{ij}$; initially, all other $d_G(i,j)$ are set to $\infty$. As previously discussed, while the original algorithm was introduced with a Euclidean distance metric, there is no reason in principle that other distance metrics cannot be applied. The distance metric could be any reasonable choice appropriate to the application at hand. In hyperspectral applications, we might choose the spectral angle, since this mitigates the effects of variable illumination (F. A. Kruse, A. B. Lefkoff, J. W. Boardman, K. B. Heidebrecht, A. T. Shapiro, P. J. Barloon, A. F. H. Goetz, "The Spectral image processing system (SIPS)-Interactive visualization and analysis of imaging spectrometer data," Remote Sensing of Environment, Vol. 44, pp. 145-163, 1993). Note that inside the neighborhood, the graph and manifold distances $d_M(i,j)$ are the same [$d_M(i,j) = d_G(i,j)$] using the fact that the manifold is assumed to be linear within a neighborhood. Once the graph has been initialized in this manner, the remaining estimated manifold distances $d_M(i,j)$ outside of the neighborhood are computed. An exhaustive iterative method known as Floyd's algorithm, described in *Introduction to*

*Parallel Computing*, "Design and Analysis of Algorithms", V. Kumar, A. Grama, A. Gupta, and G. Karypis, Redwood City, Calif. Benjamin/Cummings Publishing Company Inc., 1994, incorporated herein by reference, which scales as $O(N^3)$, is optimal for dense graphs. For sparse initial graphs, often the situation in many practical applications, the scaling can be improved by using Dijkstra's algorithm ("The ISOMAP algorithm"). The term sparse means that the number of edges E (number of edges initially <∞ between pairs of samples is small compared to the square of the number of graph vertices $V^2$, which is also the square of the number of samples $N^2$. The edges of the sparse initial graph are the distances to those points that lie within a neighborhood of each other. If the neighborhood is chosen to be small, a desirable feature to ensure local linearity, then the initial graph will be sparse and Dijkstra's algorithm is the better choice. The improvement in scaling can be quantified by considering a result found in R. Sedgewick, Algorithms in C++, Part 5: Graph Algorithms, 1992. and later used in ("The ISOMAP algorithm"). For the all-pairs shortest path problem using Dijkstra's algorithm with a minimum priority queue implemented with a d—way heap, the processing time scales as $O(VE \log_d(V))$ with $$d = \frac{E}{V}$$

when d>2. Since, V=N, and $$E = \frac{mN}{2}$$

where m is the mean number of neighbors, we obtain the scaling quoted earlier. Note that this is a worst-case upper bound, and in practice, we have found that choosing a somewhat wider heap with $$d > \frac{E}{V}$$

may sometimes yield improved run times. It should also be noted that the base of the logarithm in the scaling of the Dijkstra algorithm may be further improved to $O(N^2 \log_e(N))$ if a Fibonacci heap (described in further detail in T. H. Cormen, L. E. Leiserson, R. L. Rivest, C. Stein, Introduction to Algorithms, Second Edition, The MIT Press, 2001 and included by reference) is used as the basis of the minimum priority queue. We have implemented the minimum priority queue using both d-way heaps and Fibonacci heaps. In Table I, below we present some scaling times when the Dijkstra algorithm is implemented with a minimum priority queue based on a d-way heap.

In the Floyd implementation, the following update rule is used for all samples:

$$d_G(i,j) = \min_k(d_G(i,j), d_G(i,k) + d_G(k,j)) \qquad (2)$$

Figure 7:
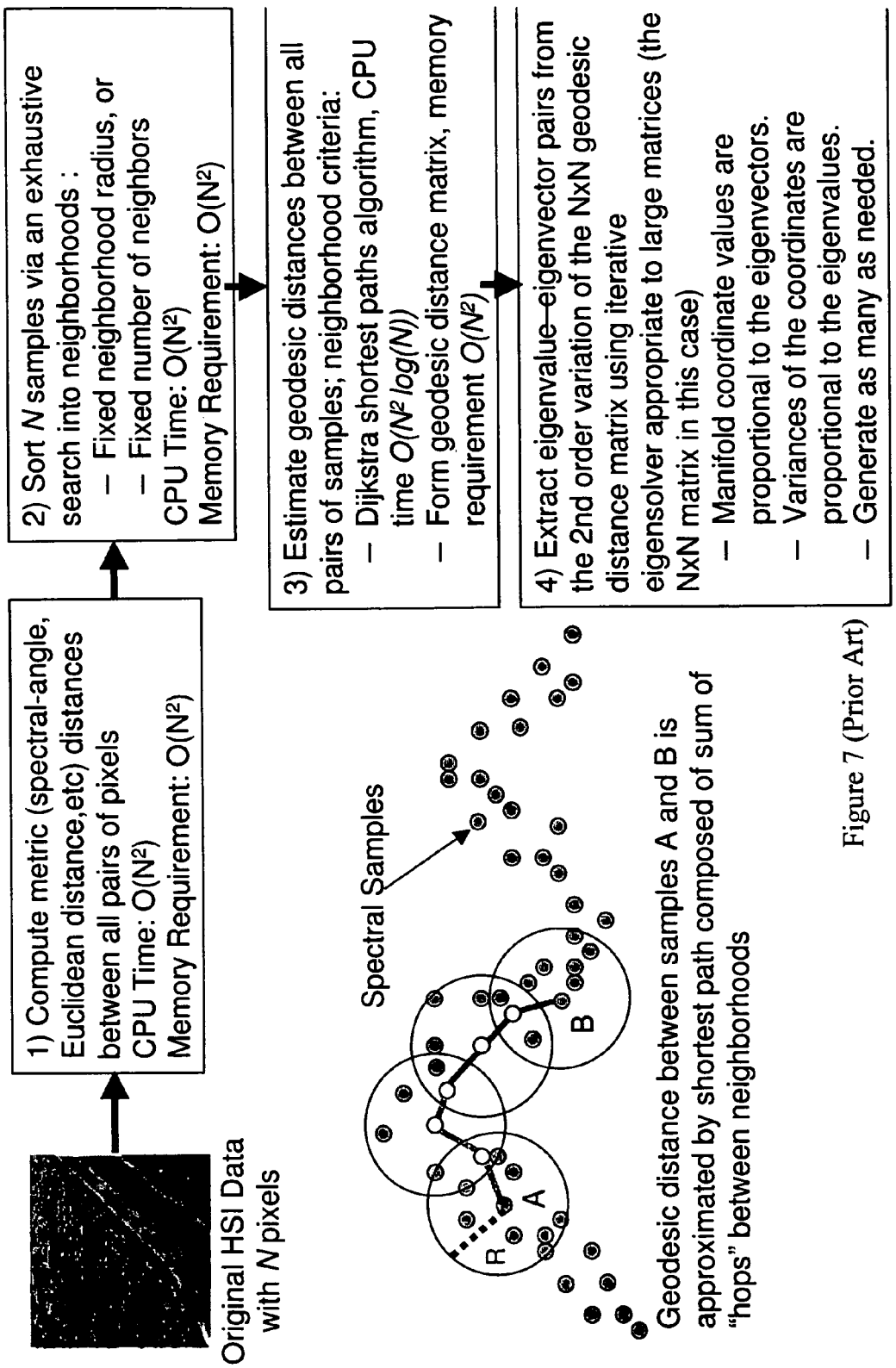
FIG. 7 is a flow chart showing the ISOMAP algorithm, which represents the prior art.

The Dijkstra algorithm uses the same "relaxation" rule for edges, but the choice of which edges are relaxed at each iteration is controlled by a minimum priority queue. The use of Dijkstra's algorithm to find geodesic distances between spectral samples proceeds by determining metric distances between all pairs of points. In particular, in the Dijkstra algorithm, as before, the neighborhoods, i.e. list of neighbors within a particular distance or within a specified closest number of neighbors and metric distances to each of these neighbors, are, determined and the edges between each point and its neighbors are assigned to their respective metric distances. The term "metric distance" refers to the method of measuring distance between samples in the locally linear neighborhood of the manifold; it could be the Euclidean distance, the spectral angle, or some other appropriate means of assigning a local distance between samples. Note that the distance between samples that are not neighbors is not measured with this local distance metric; rather between non-neighboring samples, the distance is computed by summing paths through samples that are common to more than one neighborhood. The latter is illustrated in the inset of FIG. 7, where we refer to this summing process as "a sum of hops". Thus, what the Dijkstra algorithm or any other shortest path algorithms that could be used in its place, what we compute is the shortest geodesic (nonlinear) distance which is a sum of distances summed by finding neighbors. The remaining edges between the source sample (sometimes referred to as a "node" subsequently because we are using graph algorithms such as the Dijkstra algorithm to calculate the shortest path geodesic distances, wherein each node represents one of the hyperspectral samples) and all other samples that are not neighbors are set to infinity (in practice a very large number on a computer). The infinity symbolizes not being attached. Thus, in terms of the graph, each point is only attached to its neighborhood in the beginning. The Dijkstra algorithm constructs the graph by starting with a single source point, placing all distances to other points on a minimum priority queue. At each iteration, the closest remaining node in the minimum priority queue is removed from the queue and the edges between the source node and all neighbors of the node extracted from the minimum priority queue are relaxed according to Equation (2). After this relaxation step, the sample will be fully attached to graph and its shortest-path distance to the source node is completely established. By the term "shortest path" distance, we again mean in the sense of geodesic distance along the nonlinear surface as in the inset in FIG. 7. The time to extract a node from the minimum priority queue scales as $O(N \log(N))$ as noted above. In order to find all shortest-path geodesic distances between pairs of samples, Dijkstra's algorithm is run N times, once with each point as the source point. Thus, the time to compute all shortest-path geodesic distances between spectral samples scales as $O(N^2 \log(N))$. Because of the sorting that takes place in the minimum priority queue, many unnecessary comparisons that are made in the Floyd algorithm are omitted by Dijkstra, and for sparse initial graphs, this provides the $$O\left(\frac{N}{\log_d(N)}\right)$$

speed up in processing time. On the other hand, if the graph is initially dense, the sorting actually results in longer processing times for the Dijkstra algorithm compared to the Floyd algorithm. For the applications we consider here, the density of the graph is controlled by the neighborhood size set by the user (the $\epsilon$ in $\epsilon$-ISOMAP or the number of neighbors K in K-ISOMAP), and in practice a sparse graph is obtained. When all points have been exhausted, $d_G(i,j)$ will contain the shortest distances along the manifold between any two points $\mathbf{x}_i$ and $\mathbf{x}_j$ and will be the best estimate of the true manifold distances $d_M(i,j)$ for a particular choice of neighborhood size. Note that (2) and the initialization phase described above take advantage of the local properties of the neighborhood and the triangle inequality to determine the shortest path distances on the manifold. It should be noted that one or more pockets of points may be isolated from the main distribution, in which case some distances remain infinite at the termination of the geodesic distance estimation. These disconnected points can either be omitted as outliers or attached in some self-consistent manner. In our implementation of ISOMAP, we handle disconnected pairs of points by looking for the closest disconnected pair of points (closest in the sense of the distance metric); the pair is reconnected to the graph using this distance, and then an attempt is made to attach the remaining set of disconnected pairs through the reconnected pair. This is self-consistent because an isolated pocket of points may have been fully connected within the pocket but not to the main distribution, so establishing the closest link to the main distribution allows known geodesic distances in the main distribution and in the pocket to be connected, while preserving the internal geodesic structure of each. If there are more than two disconnected pockets, the process is repeated until all points are reconnected. This process generates the minimum spanning tree that connects the isolated pockets of points. We use this approach because it ensures that no data are excluded from the analysis, and because it maintains the principle of minimum path geodesic distance between pockets of disconnected points. Once the graph has been determined, the new coordinate system is determined by applying a multidimensional scaling algorithm to determine eigenvectors in the embedded linear space characterized by $d_G$. Specifically, let $\vec{v}_i$ and $\lambda_i$ be the ith eigenvector and eigenvalue of the transformed distance graph matrix $$\tau = -\frac{1}{2} H^\tau S H \tag{3}$$

where is S defined by $$S_{ij} = ((d_G)_{ij})^2 \tag{4}$$

and H is a "centering matrix," given by $$H_{ij} = \delta_{ij} - \frac{1}{N} \tag{5}$$

where $\delta_{ij}$ is the Kronecker delta function. Then, the matrix $\tau$ measures the second-order variation in the geodesic distance between a pairs of sample vectors, and the final embedded manifold coordinates are given by $$\vec{M}_i = \sqrt{\lambda_i}\, \vec{v}_i \tag{6}$$

Note that the eigenvectors $\vec{v}_i$ diagonalize the N×N matrix $\tau$, so these vectors are N-dimensional, where N is the number of pixels in the dataset, and there are at most N such vectors. Typically, however, we will be interested in a substantially smaller number of components. From the eigenspectrum of the matrix $\tau$, we have found that the intrinsic manifold dimension of our hyperspectral datasets is substantially smaller than the input dimensionality (number of samples N). Iterative eigensolvers are appropriate for large matrices, when only a small subset of the eigenvectors is actually required. We use the Jacobi-Davidson QR (JDQR) iterative eigensolver because it is considered to be among the more reliable methods.

Local Linear Embedding

Local linear embedding (LLE) was first proposed in "Nonlinear dimensionality reduction by locally linear embedding," S. T. Roweis and L. K. Saul, *Science*, vol. 290, no. 5500, pp. 2323-2326, December 2000. The basic idea is to construct a locally linear model for each sample vector in terms of its neighbors. On the data manifold, any sufficiently small region will be locally linear, so we can expect to be able to reconstruct any point within a neighborhood from the set of other points within that neighborhood. For sample vector $X_i$, the reconstruction of $X_i$ is a simple linear combination of neighboring points $$X_i = \sum_{neighbors, j} W_{ij} X_j \tag{7}$$

where $$\sum_{neighbors, j} W_{ij} = 1, \tag{8}$$

and $W_{kl} = 0$, if $k$ and $l$ are not neighbors.

The $W_i$ are the linear weighting factors in Equation (7) which create the reconstruction; we subsequently refer to them as "weights". Roweis and Saul note that this form is invariant to any neighborhood-preserving transformation accomplished by rotation, translation, or rescaling. The fundamental concept is that if the manifold is lower dimensional than the original data space, then this same reconstruction should hold within the neighborhood, either in the original coordinates or the reduced manifold coordinate system. Thus, if $Y_i$ is the manifold coordinate representation for sample vector i, then we also have $$Y_i = \sum_{neighbors, j} W_{ij} Y_j \tag{9}$$

Once the weights in (7) are found by a least squares minimization procedure, these same weights are used to solve for the manifold coordinates Y in (9). Additional constraints are added that ensure that the covariance matrix of the embedding vectors $Y_i$ is normalized to unity to prevent degeneracies and that the manifold coordinates are centered about the origin. The reconstruction error in the manifold coordinate system, which is minimized to obtain the coordinates $Y_i$, has the form $$\xi(Y) = \sum_i \left| Y_i - \sum_{neighbors, j} W_{ij} Y_j \right|^2 \tag{10}$$

With the additional constraints, this can be written as $$\xi(Y) = \sum_{ij} M_{ij}(Y_i^T Y_j) \quad (11)$$

$$M_{ij} = \delta_{ij} - W_{ij} - W_{ji} + \sum_k W_{ki} W_{kj}$$

Like the Dijkstra implementation of ISOMAP, the scaling of LLE computationally is only $O(N^2 \log(N))$, but this is still large when is the number of pixels in, for example, a large hyperspectral scene.

Results for Hyperspectral Data Compression: Manifold Coordinates Versus MNF

Figure 2:
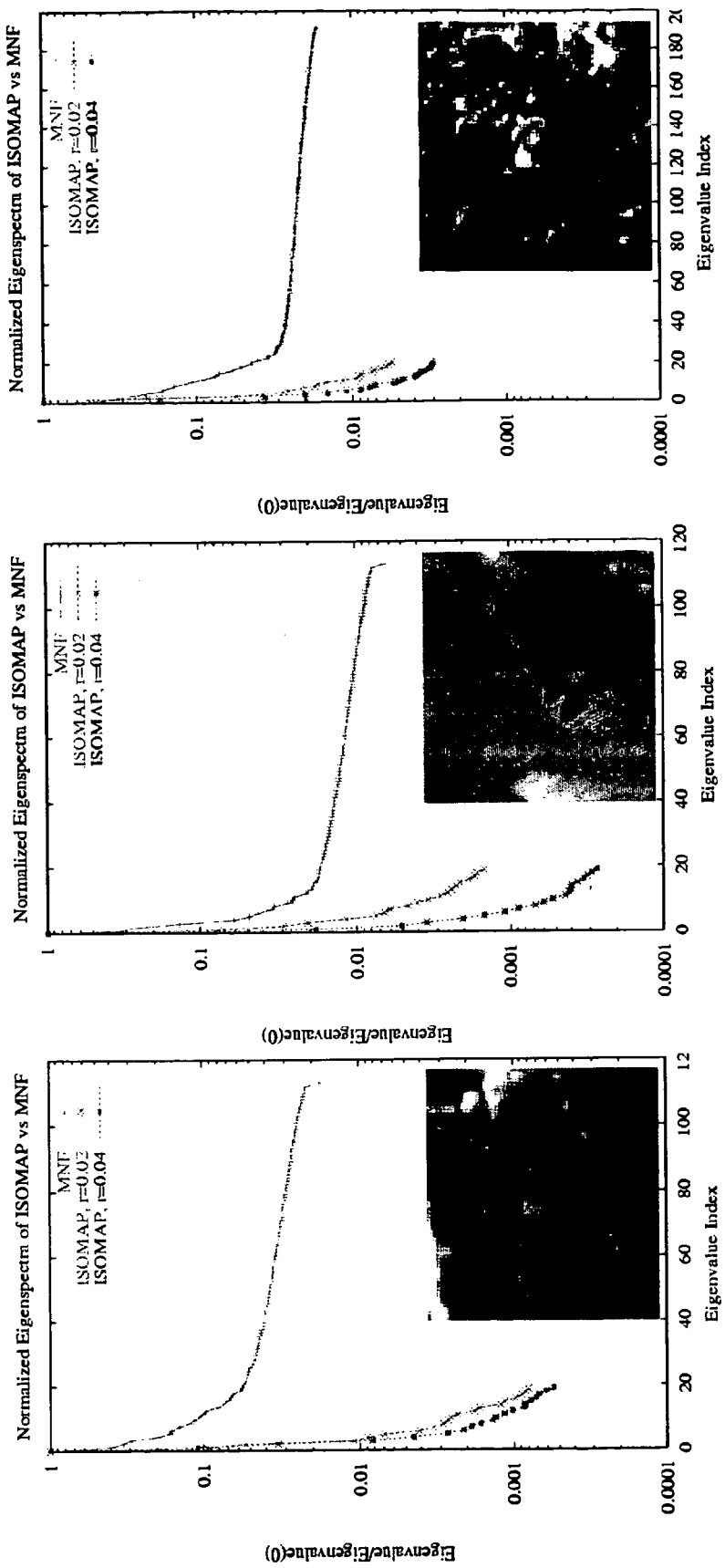
FIG. 2 is a normalized eigenspectra (log scale)$\frac{\lambda_i}{\lambda_0}$ comparing classical MNF approach to the prior art ISOMAP manifold coordinates for two different neighborhood radii of 0.02 and 0.04 rad (neighborhood distance metric was spectral angle) (Left) a vegetated land-cover tile (an upland and marsh zone) from the PROBE2 scene previously described, (middle) a shallow water region containing suspended clam nets from the same scene, and (right) a nonvegetated region in a 1997 Airborne Visible/Infrared Imaging Spectrometer (AVIRIS) scene of Cuprite, Nev.

Improved data compression of ISOMAP over traditional linear approaches based on principal component analysis (PCA) and multidimensional scaling (MDS) has been demonstrated for several applications, including hand-written character recognition and face recognition under variable pose and illumination conditions. The principal reason for improved compression is that, by deriving an embedded coordinate system, the underlying nonlinear characteristics of the data manifold are more naturally and compactly represented by ISOMAP than by linear approaches. We have obtained similar results for hyperspectral data as we now illustrate. MNF has become a de-facto standard for reduction of noise and redundancy in hyperspectral and other remote sensing data sources and appears as a standard option in commercial global information system packages. MNF, a linear transform method, calculates a set of ordered principal axes, which are ranked by signal-to-noise ratio (image quality); it can be viewed as a noise-whitened PCA analysis. In FIG. 2, we compare eigenspectra normalized by the first eigenvalue $$\frac{\lambda_i}{\lambda_0}$$

for three image subsets, contrasting MNF with ISOMAP. The examples in the figure are derived for: [FIG. 2 (left panel)] a vegetated land-cover tile (an upland and marsh zone) from the PROBE2 scene previously described, [FIG. 2 (middle panel)] a shallow water region containing suspended clam nets from the same scene, and [FIG. 2 (right panel)] a nonvegetated region in a 1997 Airborne Visible/Infrared Imaging Spectrometer (AVIRIS) scene of Cuprite, Nev. In all cases, the eigenspectra show that the vast majority of the variation in the data is captured in the first 5-15 ISOMAP components, while to achieve the same level of accuracy the vast majority of the MNF components must be retained.

Manifold Representations of Hyperspectral Scene Tiles

Figure 3:
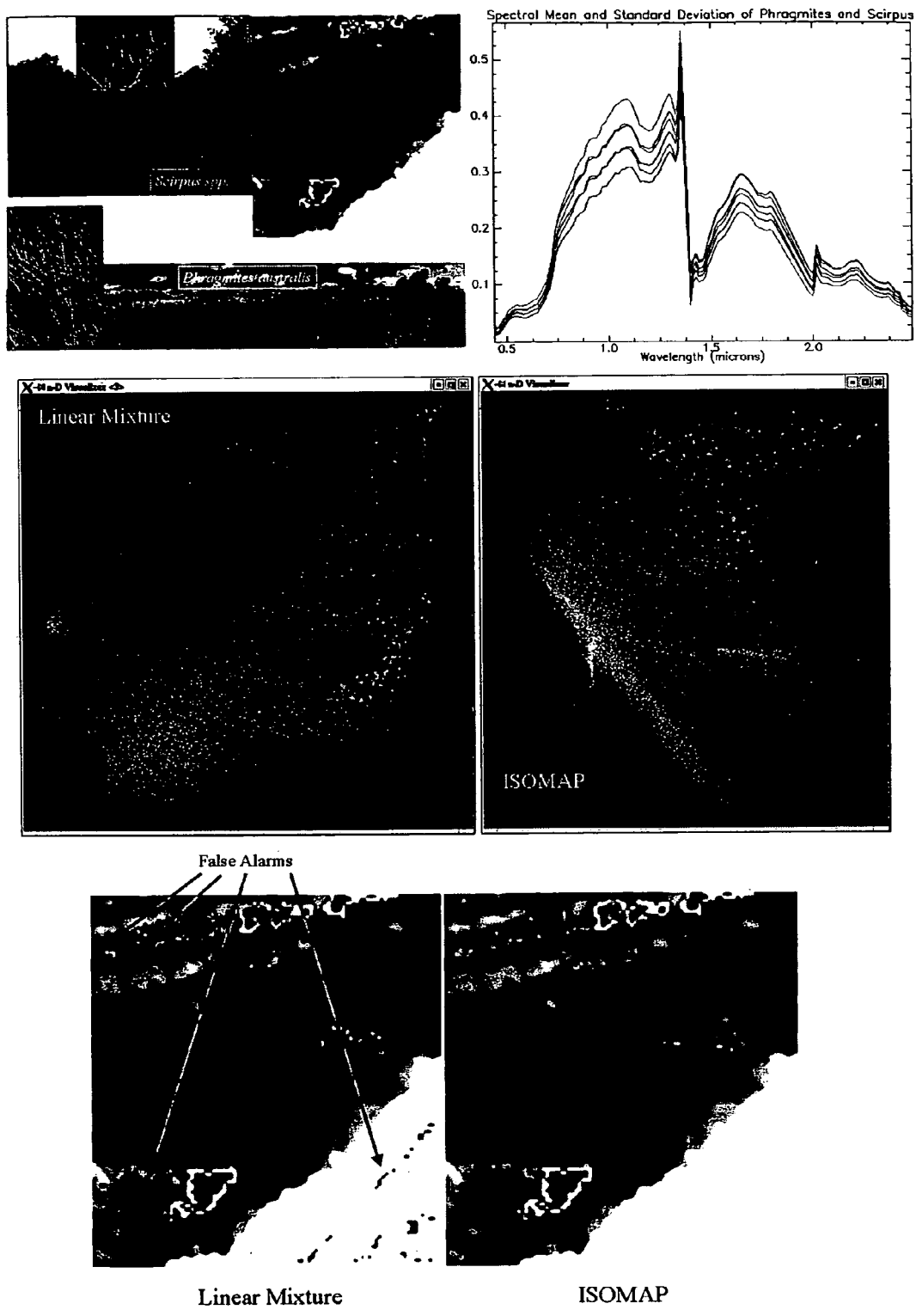
FIG. 3 is a comparison of the ORASIS linear mixture model and ISOMAP for spectrally similar vegetation classes *Phragmites australis* and *Scirpus* spp. for a small hyperspectral image subset using the prior art approach.

In this section, we turn our attention to the effectiveness of the manifold coordinate representation in separating spectrally similar classes and compare it with one of the standard linear mixing models referred to above. The example that we use here is the separation of spectrally similar vegetation in coastal vegetation mapping; however, as the previous section on compression demonstrated, the range of potential applications is diverse. Prior approaches to classifying barrier island land-cover from airborne hyperspectral data emphasized machine learning approaches and multi-classifier fusion concepts on a large scale. One source of errors in these models stems from the confusion of spectrally similar vegetation such as *Phragmites australis*, an invasive wetland reed, and *Scirpus* spp., a sedge. Although the two plants are not similar morphologically, during the fall when the PROBE2 scene described in FIG. 1 was acquired, the brown tassel of *Phragmites* and brown seed pods of *Scirpus* combine with the stalk vegetation and partially exposed subcanopy to produce a spectrally similar return (FIG. 3). A conjecture was that this might be resolved using a more traditional linear mixing approach, but this has not proved to be the case. We compared the ISOMAP algorithm with linear mixing for this problem. In FIG. 3, we show a 100×100 pixel section of the scene with superimposed differential GPS (DGPS) ground truth survey data for known locations of *Phragmites* and *Scirpus*. In the same figure, we show the result of classifying the second, third, and fourth components of both a linear mixing approach (ORASIS) and ISOMAP. Note that the term "component" in the case of linear mixing refers to an ordering of the demixed endmembers in terms of the degree of data variability in the direction of the endmember. We examine these components because the compression results suggest that the manifold representation may be more compact than linear methods, so we look for separation of spectrally similar classes in some of the most significant components. The classification proceeded using spectra at known locations from the DGPS survey as seeds. In each representation, we proceeded conservatively, choosing only the areas where the category seeds were isolated from each other in the linear mixture or ISOMAP representations. Adjacent points were then assigned to the class of the closest seed. The resulting classification is shown in FIG. 3. For both the ORASIS and ISOMAP representation, we chose the set of three components in which the best separation between *Phragmites* and *Scirpus* data samples was observed. The results show that adjacent points in the ISOMAP representation map directly to other points of the same category; however, the linear mixing case produces false alarms in the backdune, in a swale entirely dominated by *Scirpus* in the top of the 100×100 subset, and in the bottom left corner of the subset near one of the seed zones. We emphasize that although both ORASIS and ISOMAP scatter plots had regions where the ground truth spectra partially overlapped, the classification proceeded from seeds where there was no overlap between the two categories. Thus, the false alarms in classifying the ORASIS representation occur because adjacent pixels from other land-cover types are immediately adjacent to the seed pixels, while in the ISOMAP representation, the pixels immediately adjacent belonged to the same class. Therefore, the ISOMAP classification did not have the same problem with false alarms. This implies that nonlinear correlations between spectral channels exist and are better separated by a representation that directly parameterizes these nonlinearities.

In order to derive manifold coordinate systems for hyperspectral imagery on a practical scale, where the number of pixels in a typical flightline in our study area is $O(10^6)$ or greater, we adopt a divide, conquer, and merge strategy. Specifically, and as is further described below, we first divide the scene into a set of non-overlapping tiles where ISOMAP can derive an optimal coordinate system in a relatively short time with modest memory requirements. The global scene manifold is then obtained by merging the tile manifolds.

In particular, we replace a linear notion of similarity, in which simple linear distance (e.g., linear distance from an endmember) describes distances between all pairs of sample points, with the concept of geodesic distance, in which distance is measured by tracing the trajectory of the data manifold. This is equivalent to finding a coordinate system that resides on the manifold and measuring similarity by estimating geodesic distance along the manifold itself. A corollary to this is that once we can discover such a manifold coordinate system, then the geodesic distance along the manifold is just the linear distance in the manifold coordinate system. In what follows, we provide examples using both spectral angle and Euclidean distance for the local metric, while past expositions of these algorithms have typically chosen only Euclidean distance as the input distance metric. Nevertheless, the same arguments apply.

Regardless of the choice of local distance metric, the remainder of the algorithm as described here has the same form. Our purpose here is not to decide which is the best choice of metric for locally linear neighborhoods, but rather to present the general framework for estimating geodesic distances over an inherently nonlinear data manifold.

Scaling to Large-Scale Remote Sensing Datasets

It is scaling that prevents the direct application of the globally optimal ISOMAP algorithm to large remote sensing datasets. We want the optimal coordinates of ISOMAP but not its computational complexity and especially not its memory requirements, which make direct application impractical for scenes of even modest size. Table I gives some typical times and memory requirements for the dominant calculations in the ISOMAP approach for two hyperspectral tiles, the vegetated land tile derived from the PROBE2 scene, and the nonvegetated tile from the 1997 AVIRIS Cuprite scene.

Friedman, The Elements of Statistical Learning, Data Mining, Inference, and Prediction. New York: Springer-Verlag, 2001):

$$P_i = (M_i^T M_i)^{-1} M_i^T M_j \quad (12)$$

Note that the size of both matrices is $N_c \times p$, where p is the dimensionality of the derived manifold coordinate system. If an offset is allowed, then the matrices are $N_c \times (p+1)$.

A second approach, which we term "the backbone method", is to define a small decimated data cube from the original scene by random sampling. The hope is that such an approach would provide enough samples that represent the global space of possible spectral samples, so that the tile manifolds could be spliced onto this "backbone." By design, we can insist that the backbone input data cube be formed by obtaining a fixed number s of random samples from each tile. The common points then act as guideposts that will allow a change of coordinates from the local tile manifold to the globally coordinated backbone manifold. Let $M_i$ be the coordinates of the ith tile manifold, and let B be the coordinates of the same points in the backbone manifold. Then, the coordinate transformation from the tile manifold coordinate system to the backbone manifold coordinate system, can be rapidly estimated using the pseudoinverse as before $$P_B = (M_i^T M_i)^{-1} M_i^T B \quad (13)$$

TABLE I

SCALING OF ε-ISOMAP. PENTIUM IV PROCESSOR, 3.06 GHz
Memory Requiremtns and Total Processing Time to Extract First 10 Manifold Coordinates

| Graph Alg. | Spatial Dim. (V = N) | NxN Geodesic Memory Req. | ε | Avg. No. Neighbors | $d = \frac{E}{V}$ | Time (minutes):Geodesic Graph Only | Total Time (minutes) |
|---|---|---|---|---|---|---|---|
| Typical Land Tile. PROBE2 Hyperspectral Data, Using 114 of 124 spectral channels |||||||||
| Dijkstra | 50x50 | 0.050 GB | 0.02 | 150.4 | 75 | 0.3 | 0.53 |
| Dijkstra | 75x75 | 0.253 GB | 0.015 | 59 | 30 | 0.9 | 3.2 |
| Dijkstra | 75x75 | 0.253 GB | 0.02 | 168.2 | 84 | 0.67 | 3.8 |
| Dijkstra | 75x75 | 0.253 GB | 0.03 | 489.9 | 290* | 3.61 | 5.32 |
| Dijkstra | 100x100 | 0.8 GB | 0.02 | 302.9 | 155* | 8.23 | 15.37 |
| Floyd | 50x50 | 0.050 GB | 0.02 | | | 1.77 | 2.02 |
| Floyd | 75x75 | 0.253 GB | 0.02 | | | 22.73 | 25.13 |
| Typical non-vegetated tile, AVIRIS, Cuprite 1997, Using 192 of 224 channels |||||||||
| Dijkstra | 75x75 | 0.253 GB | 0.015 | 8.8 | 5 | 0.53 | 2.78 |
| Dijkstra | 75x75 | 0.253 GB | 0.02 | 48.9 | 24 | 1.17 | 3.15 |
| Dijkstra | 75x75 | 0.253 GB | 0.03 | 333.8 | 167 | 2.85 | 5.07 |

*Indicates, d chosen > $\frac{E}{V}$.

ISOMAP can be applied readily to small tiles within a scene to achieve a globally optimal coordinate system within each tile. The challenge, however, is to derive a globally consistent manifold coordinate system, so that manifold distances from points in one tile to points in another disjoint tile will be accurate. One approach would be to augment each tile with a small common set of data tie-points. These tie-points would then allow the manifold from one tile to be transformed into the manifold coordinate system of any other tile. Let $M_i$ be the matrix of coordinates of the tie-points in the ith tile manifold, and $M_j$ let be their coordinates in the jth tile manifold. Then, the coordinate transformation from the jth tile to the ith tile coordinate system can be rapidly estimated using the pseudoinverse (see, for example, T. Hastie, R. Tibshirani, and J.

Sufficient sample size is the key to successful application of the "backbone" method. Even using the Dijkstra algorithm to calculate the $N^2$ shortest path geodesic distances, there are several additional scaling issues which must be overcome in order to successfully apply the "backbone" approach to obtaining the global manifold. Another variation on the "backbone" approach (hereafter referred to as the "modified backbone" approach) is to choose a sufficiently large representative subset of the data, obtain the manifold coordinates for the backbone using ISOMAP with the Dijkstra shortest-path method, and then systematically insert all remaining points into the coordinate system of the backbone manifold using the reconstruction principle defined in Equations (7) and (9). Details of this are described further below.

Figure 4:
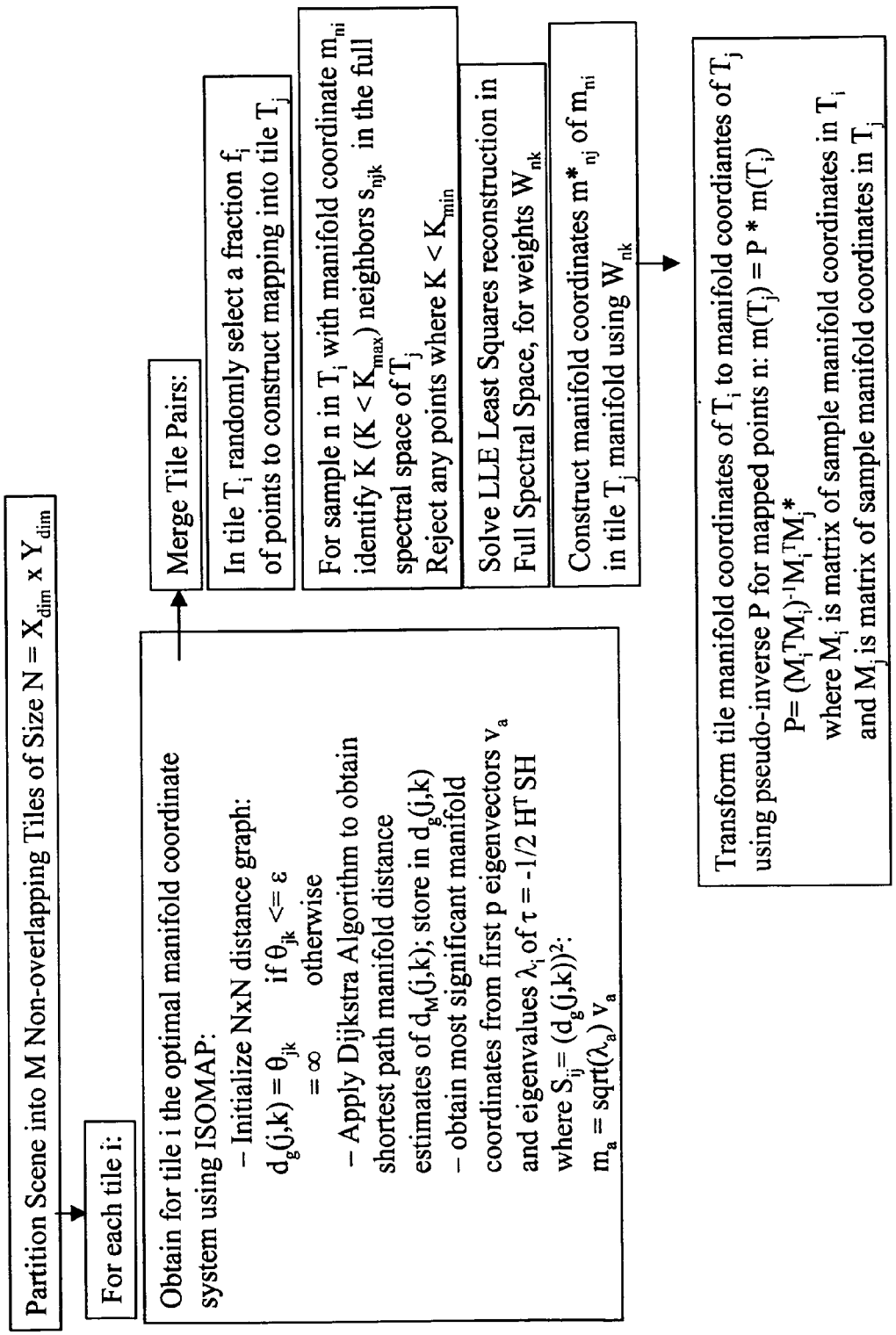
FIG. 4. is a flow chart illustrating a hybrid approach to merging manifold coordinates according to the invention.

A third alternative strategy returns us to the fundamental concept behind the manifold, namely that on the manifold the data is locally linear. Indeed, we saw LLE took advantage of this local linearity in both the manifold coordinate system and in the original data space, to construct local linear embedding transformations that preserve neighborhood geometry. Now, suppose that we have optimized manifold coordinates for tile $T_j$ using ISOMAP and that we extract a random fraction $f_i$ of samples from an adjacent tile $T_i$ that has also been optimized by ISOMAP. For sample n from tile $T_i$, let $m_{ni}$ be the manifold coordinate and $s_{ni}$ the coordinates in the full spectral space (the original spectrum). Presuming that adjacent tiles have enough data of similar type, we can expect that a good fraction of these points will have neighbors in the full spectral space. We search for K neighbors of $s_{ni}$ in the full spectral space of tile $T_j$. Let these K neighbors of $s_{ni}$ in the full spectral space of tile $T_j$ be denoted by $s_{njk}$. Whenever we encounter less than $K_{min}$ neighbors in the full spectral space, we reject this point for later use in the mapping that we want to construct from the manifold coordinates of tile $T_i$ to tile $T_j$. For each point with a sufficient number of neighbors, we now solve for the least squares reconstruction weights $W_{nk}$ of $s_{ni}$ in the full spectral space of tile $T_j$ using the neighboring samples $s_{njk}$, as was done in the LLE algorithm described earlier. As we saw earlier, because LLE is a neighborhood-preserving transformation, we can now construct the manifold coordinates of $m_{ni}$ in tile $T_j$, which we denote by $m_{nj}^*$, using the weights $W_{nk}$ derived for the neighbors in the full spectral space. Once we have done this for a sufficient sample of points, we can then construct a transformation matrix from the manifold coordinates of tile $T_i$, $m(T_i)$ to those of tile $T_j$, $m(T_j)$:

$$m^* = m(T_i) = P^* m(T_j) \quad (14)$$

again using the pseudoinverse P $$P = (M_i^T M_i)^{-1} M_i^T M_j^* \quad (15)$$

where $M_i$ is the matrix of manifold coordinate samples $m_{ni}$ from tile $T_i$, and $M_j^*$ is the corresponding set of coordinates constructed in the manifold coordinate system of tile $T_j$ using LLE insertion. These steps are summarized in FIG. 4. We refer to this third method of aligning manifold coordinates as "the pseudoinverse method" in subsequent discussion.

Results: Aligning Tile Manifolds Using the Pseudoinverse Method

A 124-channel PROBE2 airborne hyperspectral scene of Smith Island, Va. acquired on Oct. 18, 2001 was partitioned into a set of 75×75 pixel tiles. For each tile, ISOMAP was used to derive an optimal tile manifold coordinate system. All three approaches to merging tile manifold coordinates were evaluated using this data. The advantage of the approach that uses an LLE reconstruction of a limited set of points and then the pseudoinverse is that it scales as $O(n_{f_i}^2)$, where $n_{f_i}$ is the number of points needed to construct the mapping from one tile to an adjacent one, and this is typically a small number. In the tests that we performed with 75×75 tiles, we were successful in merging tiles using 300 pixels in the mapping. In contrast, the backbone approach requires significantly more samples to work because, in effect, we must create an entirely new representative manifold. For the backbone approach, we found that nearly 50% of the samples from each tile in a two-tile merge were required to ensure a merge with a minimum of discontinuities. Because the backbone approach is sample-limited, and optimization of the backbone manifold scales the same way that the tiles do computationally, this makes it less attractive for merging a large number of tiles, at least when the psueodoinverse merge incorporates the prior art ISOMAP algorithm as the underlying basis for calculating manifolds and exhaustive search is used to find neighbors for the reconstruction step; below we show that a "modified backbone" method incorporating an enhanced ISOMAP method that we have developed and a fast neighborhood search method, can be used to achieve the most robust global solution. The tie-point approach suffered from similar scaling issues. If a sparse set of tie-points samples are employed, this tends to create isolated pockets in the distance graph, which ultimately led to poor matching. Overcoming this requires a large number of tie-points, which leads to long computational times.

Figure 5:
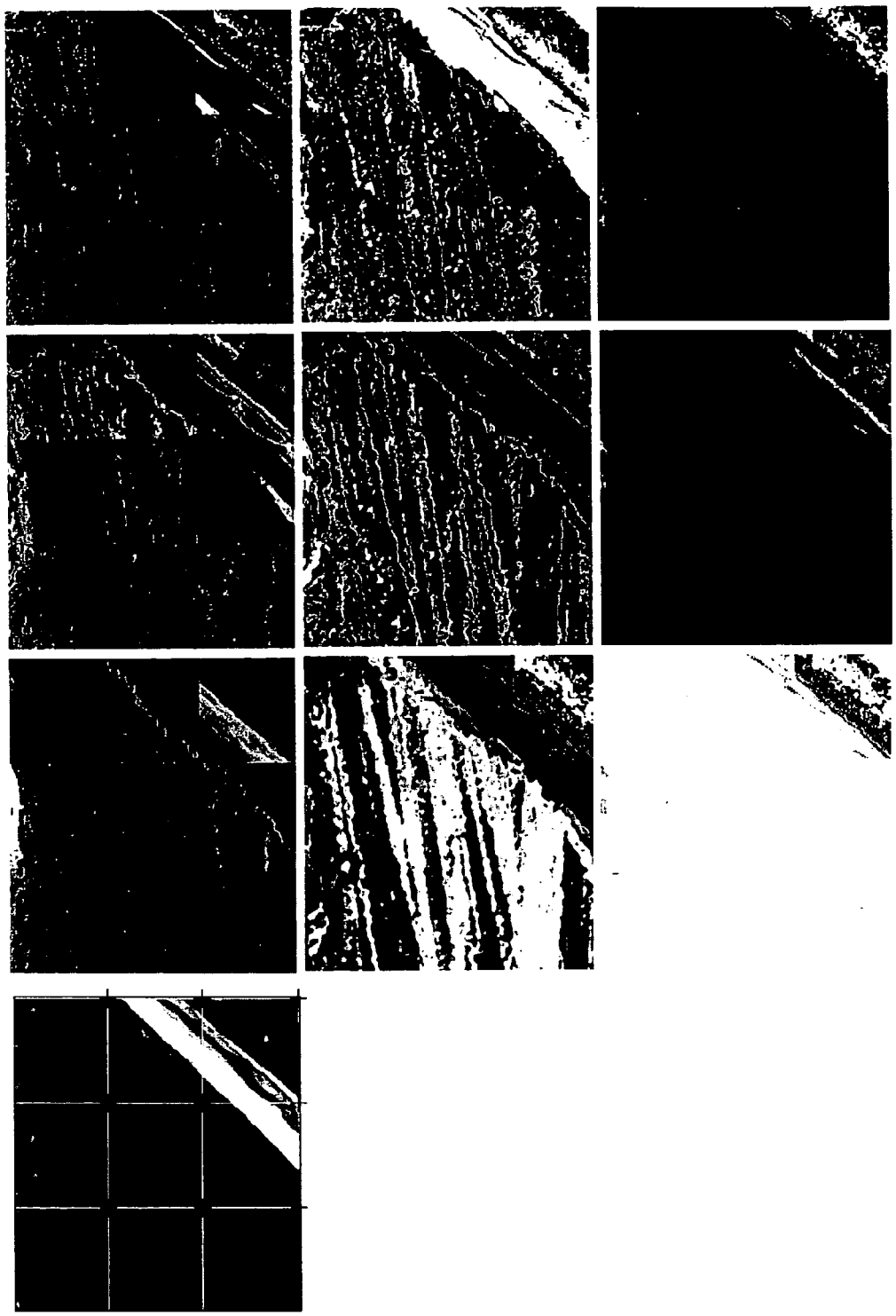
FIG. 5. shows results obtained from merging manifold coordinates according to the invention.

FIG. 5 shows a set of nine tiles derived from the hyperspectral flightline. For each of these nine tiles, a manifold coordinate system was derived using ISOMAP. As the top row of the figure shows, the original tile manifolds show a rich structure, but the coordinate systems are not aligned. When the pseudoinverse LLE processing is applied to these using roughly 300 points, an excellent fit of the coordinate systems results. In this example, all nine tiles ultimately were aligned to the tile in the upper right corner. This proceeded in two stages. If the tiles are numbered by consecutive rows, then, in the first stage, the sixth and ninth tiles were each converted to the manifold coordinate system of the eighth tile. These are the only tiles that show any beach, dune, or surf. Then these two transformed tiles and all the remaining tiles were aligned to the the manifold coordinate system of the tile in the upper right corner. The logic behind this relates to the types of land-cover found in specific tiles. In order for the pseudoinverse LLE processing to be able to merge tiles pairwise, the fraction of samples extracted from one tile in the pair must have a sufficient number of neighbors in the original full spectral space in order to construct the mapping. Note that in the case of the ninth tile, there were not sufficient samples found to construct a mapping that aligned the pixels in the surf zone, which were not represented in the other tiles to any great degree. For this reason, the aligned manifolds are shown with two different stretch factors because these points could not be mapped in a continuous manner and a larger number of pixels were rejected by the pseudoinverse LLE processing during the construction of the mapping. The surf zone is a distinct class that is not spectrally close to any other class in the set of nine tiles. This large distance is preserved when the tiles are merged. The surf zone appears as an anomaly with respect to data in the other tiles. The rejection of a large number of pixels by the pseudoinverse LLE processing also suggests how we can go about constructing a metastrategy for merging individual tiles. When a large rejection rate occurs, an automated version of this processing is then instructed to search for other neighboring tiles in the immediate vicinity where a more reasonable number of points could be used to merge. Conversely, if a merge is allowed, the discontinuity in the manifold mapping allows for the mapping of anomalies in a scene.

Automating the Alignment of Tile Manifolds in the Pseudoinverse Method

Figure 6:
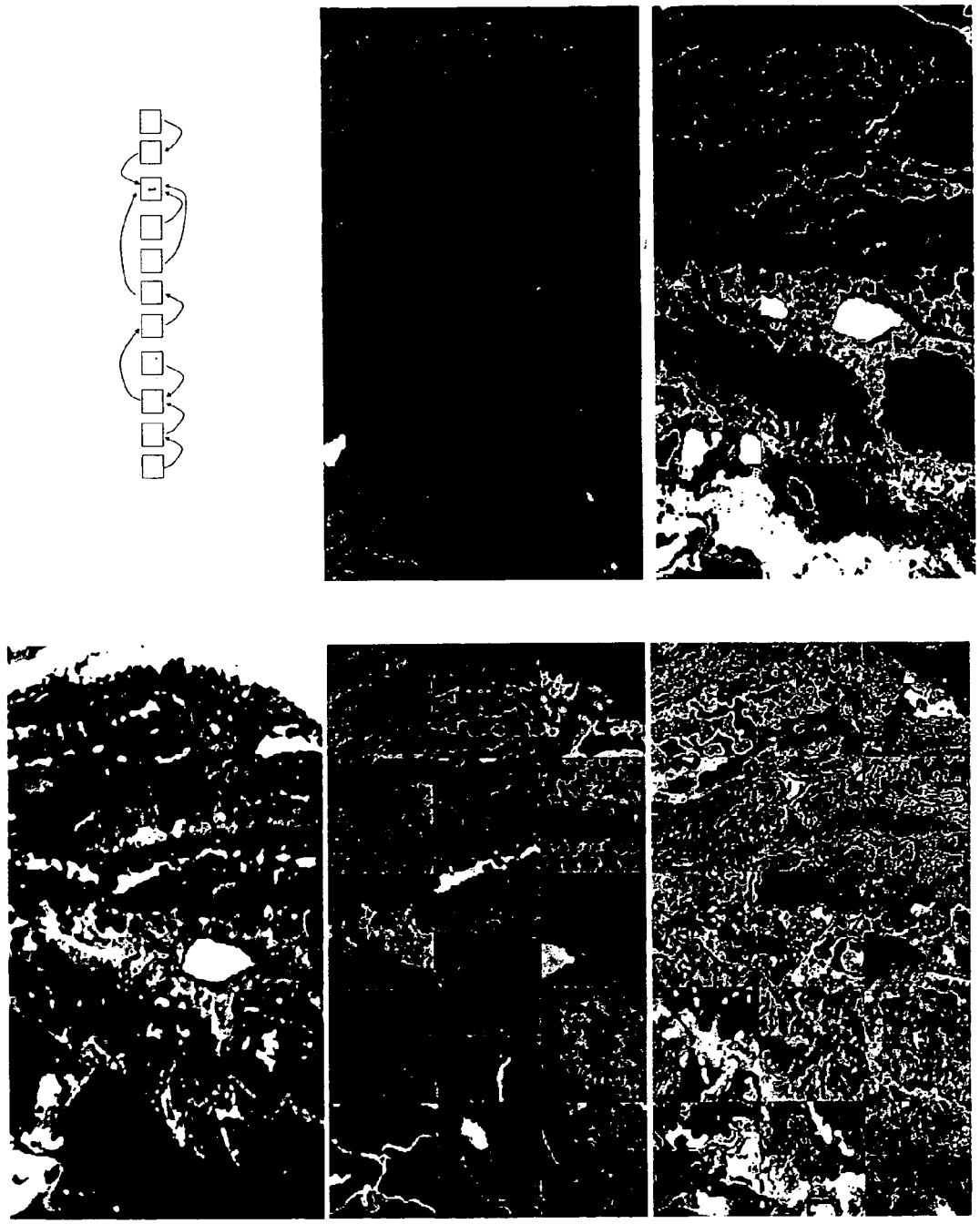
FIG. 6. shows results obtained from automated alignment of manifold coordinates according to the invention.

We focus on one possible strategy, showing its strengths and weaknesses and how improvements can be made. The basic idea is to look for a series of alignment transformations that take each tile manifold coordinate system to that of a target tile. If a tile differs significantly from the target tile, a series of alignment steps must be made between intermediate tiles that share common properties. We first look for a direct mapping to the target tile. If the tile point reconstruction does not pass thresholds for valid number of neighbors K in the target tile and average reconstruction error, then we look for the best match in a backbone directory of random points taken from each tile. The same kinds of criteria are applied at this stage, except that we allow for the possibility of expanding the matching neighborhood radius between the tile and potential intermediate tiles to ensure at least one valid "hop." The procedure records each hop for each source tile. As the procedure continues, a series of chains, some of which ultimately link to each other, is formed with various pathways to the target tile. These are a series of linear transformations described in (14) and (15). FIG. 6 shows a conceptual view of this alignment procedure. Note in FIG. 6 that the majority of the scene is aligned quite well. There are some small discontinuities at the interface between a few of the tiles. This occurs primarily because along the manifold alignment trajectory for any particular tile, the tile may not encounter a sufficient number of constraints to the manifold coordinate orientation and scales for all possible land-cover types. It also suggests strategies for improving the approach described in FIG. 6 by enforcing manifold continuity constraints between adjacent tiles. Another alternative is also discussed below.

Computational Scaling and Optimization in the Pseudoinverse Method

Subdividing a large hyperspectral flightline into a set of smaller tiles permits application of (suboptimal) nonlinear dimensionality techniques to the entire image. This paper is driven by the desire to process large remote sensing images and, simultaneously, overcome memory and computational scaling obstacles. Precise values for the memory requirements and computation times of the present algorithm are provided in Table I. Here, we present a simple scaling analysis of the basic computation and memory requirements.

Consider as an example an N pixel problem divided into G tiles, each containing $$\frac{N}{G}$$

pixels. The manifold computation for each tile scales as $$O\left(\left(\frac{N}{G}\right)^2 \log\left(\frac{N}{G}\right)\right)$$

and requires memory of $$O\left(\left(\frac{N}{G}\right)^2\right)$$

bytes. The size of the calculated distance graph determines the overall memory requirement. Once all of the individual tiles are processed, splicing them together scales computationally as $$O\left(G^2\left(\frac{N}{G}\right)\right), \text{ where } \frac{N}{G}$$

is the number of pixels per tile, and in the worst case, $O(G^2)$ pairs of tiles are tested to obtain a best-fit final result. Minimizing the total run time and dropping constants and slowly varying log terms yields $N \sim G^3$. Using a typical value of $N=10^6$ yields $G \approx 10^2$ Therefore, an optimal tile size is $$\frac{N}{G} \approx 10^4 \approx 100^2.$$

As seen in Table I, a 1-GB memory restriction limits the maximum tile size $$\frac{N}{G}$$

to a square tile approximately 110 pixels on a side. In this example, the optimal tile size happens to nicely balance typical memory and runtime constraints. A simple parallelization involves a distributed architecture, wherein each tile is processed by a separate processor. Using the example above, this requires about 100 processors each with access to ~1 GB of memory. The runtime to complete all of the individual tiles is $$O\left(\left(\frac{N}{G}\right)^2 \log\left(\frac{N}{G}\right)\right),$$

and to splice the tiles to one another is, in the worst case, $$O\left(G^2\left(\frac{N}{G}\right)\right).$$

Assuming the optimal number of tiles is chosen, the total parallel runtime scales roughly as $$O\left(N^{\frac{4}{3}} \log(N)\right).$$

Again, only the leading term is kept. Employing the same image size as before ($N=10^6$) implies that the tiling procedure improves total runtime by $$O\left(N^{\frac{2}{3}}\right) \approx 10^4$$

as compared to the entire image-at-once calculation. Similarly, the memory requirements of the tiling approach are reduced by a factor of $G^2 \approx 10^4$. Thus, subdividing large images makes these calculations feasible for large hyperspectral scenes.

The caveats to the tiling approach and to the optimization calculations involve sampling issues. First, the tile size $$\frac{N}{G}$$

must be large enough to accurately represent the manifold of the local region, and, second, each tile must sample enough of the global manifold to represent all of the features of the full scene. At present, the latter restriction appears more critical. Features that are spatially correlated and appear in only one or two tiles may not map nicely when the individual tiles are spliced together. This is the source of some of the minor spatial discontinuities in FIG. 6. A method that better samples the global manifold involves subdividing the image by decimating rather than tiling. However, the tiling approach employed here with well-defined tile boundaries permits an easy, visual analysis of the continuity of the manifold results across tile boundaries.

Further Improvements to Scaling Manifold Coordinate Algorithms to Large Hyperspectral Scenes The Modified Backbone Method of Scaling Manifold Coordinates.

Although the tiling procedure produces a practical solution to the problem of scaling manifold coordinate representations to the required scale of $O(10^6)$ pixels or greater, it does sometimes produce artifacts (FIG. 6), such as visible seams or slight tonal shifts between merged tiles. A better solution, that overcomes these artifacts and which we now detail, uses the "modified backbone" approach described above. As noted above, the "modified backbone" involves obtaining a sufficiently large subset of the data that represents the typical spectral variation present in the data set. This can be obtained by a random sampling or simply by manually extracting scene representative scene subsets. In practice, we find that as little as between 10% and 33% of the hyperspectral scene may be sufficient. The next step is to obtain a set of manifold coordinates for the backbone subset and then insert the remaining data into the backbone manifold coordinate system using the reconstruction principle defined in Equations (7) and (9). Here the weights to reconstruct each sample that is to be inserted into the backbone are reconstructed in our case in the original data space, which is the full spectral space of the input hyperspectral data. We obtain the reconstruction weights W in a different manner than that originally described in (Roweis and Saul); however, we obtain the weights W by inverting equation (7), using the eigenvectors and eigenvalues of the covariance matrix formed from the difference vectors between the sample to be reconstructed and its neighbors:

$$\vec{d}_j = X_i - X_j \quad (16)$$

With this definition, the covariance matrix of interest is:

$$C_{jk} = \vec{d}_j \cdot \vec{d}_k \quad (17)$$

for which the solution to the reconstruction weights is:

$$W_i = \frac{\sum_k C_{ik}^{-1}}{\sum_j \sum_k C_{jk}^{-1}} \quad (18)$$

with:

$$C_{jk}^{-1} = VDV^T \quad (19)$$

where V is a matrix whose columns are the eigenvectors of the matrix C, and D is a matrix that is zero on the off-diagonal, with diagonal entries equal to the inverse of the eigenvalues:

$$D_{ii} = \frac{1}{\lambda_i}, \text{ and } D_{ij} = 0, \text{ for } i \neq j \quad (20)$$

The solution to equations (16)-(20) can be obtained from a variety of standard numerical methods for determining eigenvalues, eigenvectors, and inverse matrices, e.g. the Singular Value Decomposition, QR Decomposition, LU decomposition, or other similar method.

Assuming a goal of processing a scene of size $O(10^6)$ or greater, we must therefore be able to process backbone subsets of size ~100,000-300,000 or greater in order to obtain the manifold coordinate system for the backbone subset. Four main obstacles must be overcome in order to do this. These obstacles include: (1) the computational time required to construct the neighborhoods, the sparse graph that is used to initialize the Dijkstra algorithm calculation of the manifold geodesic distances. In the prior art approach defined previously, the neighborhood calculation scales as $O(N^2)$, since neighbors must be determined by comparing the distance between each point and all other points in order to identify those lying within the neighborhood. The other computational obstacles are: (2) the time to compute the geodesic graph distance matrix which scales as $O(N^2(\log_d N))$, (3) the associated memory storage requirement for the geodesic distance calculation which scales as $O(N^2)$ (the second order variation in geodesic distance stored in the matrix τ as define in Equation 3), and finally (4) the insertion of the samples into the backbone manifold coordinate system using the reconstruction principle, which requires the calculation of the neighbors in the backbone subset of the sample to be inserted, which scales as $O(N^2)$ using prior art implementations as described above. In order to overcome these four obstacles, therefore, we must improve the basic performance of the ISOMAP algorithm and overcome the neighborhood scaling calculation which appears both in ISOMAP and in the proposed insertion in the modified backbone approach to scaling the representation to large hyperspectral scenes. We describe how to this in the sections that follow.

The Vantage Point Forest Method of Calculating Neighbors and their Distances

Of the computational obstacles cited above, the determination of the locally linear neighborhoods (the neighbor lists and their respective distances) appears twice, first in the calculation of the backbone manifold using the ISOMAP algorithm and in the insertion of the non-backbone samples into the backbone to derive their corresponding coordinates in the backbone manifold coordinate system. We have developed a new process for determining these neighborhoods which scales, at worst, as m(r)Log(N), where r is the desired neighborhood radius and m(r)<<N. This scaling is significantly better than the exhaustive neighborhood search that occurs in the original ISOMAP algorithm and scales as $O(N^2)$. Thus because of the scaling of the exhaustive method, it quickly becomes impractical for the scale of typical remote sensing data sets which might have anywhere from $O(10^6)$-$O(10^7)$ pixels in a hyperspectral scene. The typical prior art approaches to fast neighbor search algorithms in the existing literature proceed by partitioning of the input data space but have not been previously applied to the construction of manifold neighborhoods. These fast search algorithms produce a tree-like structure with successive partitioning proceeding iteratively until all points are exhausted. The beauty of such an approach is that, at each sample, it eliminates the necessity of examining all other samples in order to determine the neighborhood. In particular, it eventually focuses the search on a narrow subset of end "leaves" in the tree where possible neighbors could exist. This search procedure is sometime referred to as searching with a Vantage Point Tree (P. N. Yianilos, Data Structure and Algorithms for Nearest Neighbor Search in General Metric Spaces, Proceedings of Symposium on Discrete Algorithms, American Institute of Physics, 1993).

One limitation of previous approaches using Vantage Point Trees is that at the top level of the tree search, where the first set of comparisons are made, the search does not eliminate as many possibilities as it might. The solution that we develop overcomes this limitation by constructing a Vantage Point Forest, which tends to focus the search in a narrower portion of the high dimensional space earlier in the search process.

Construction of the Vantage Point Forest consists of a set of iterative steps. The first step is to pick the top level vantage points which form the tops of the trees in the Vantage Point Forest. These are selected at random in the following manner. Assume r is the characteristic radius within which the manifold is locally linear, and pick a maximum quantization radius $r_{maxquant}$ for each tree (a value of 2-4 times r typically works well and ultimately determines the number of rings present in each tree). Select the first top level (tree-level) Vantage Point, compute all distances to all other samples (note that the only time we make this kind of O(N) exhaustive calculation is for a small set of samples that form the top level vantage points of each Tree in the Forest), and then sort them in increasing distance out to $r_{maxquant}$ using the Dijkstra algorithm to calculate the sorted distances; for v vantage points trees, this latter steps computes in O(v log(N)) time with v<<N, so it is a very fast calculation. The remaining samples beyond $r_{maxquant}$ and those that were sorted inside $r_{maxquant}$ are assigned to the list of available sample vectors for that tree, $v_{list}$; these are removed from the available sample list for all other trees that are subsequently generated to ensure an exclusive quantization with each sample belonging to only one tree. The sorted lists of distances from each top level vantage point are divided into a set of hyperspherical shells of radius, r, 2r, . . . $r_{maxquant}$. Within each tree and within each of these shells, the same set of steps is repeated with sub-vantage points (branches) being selected at random, however, this time the distances must only be calculated to the samples available at this sublevel of the tree, i.e. to those samples in the shell; as before, these are sorted out to $r_{maxquant}$. The process proceeds in this manner iteratively stopping when all samples are within r of the parent tree or branch.

Figure 8:
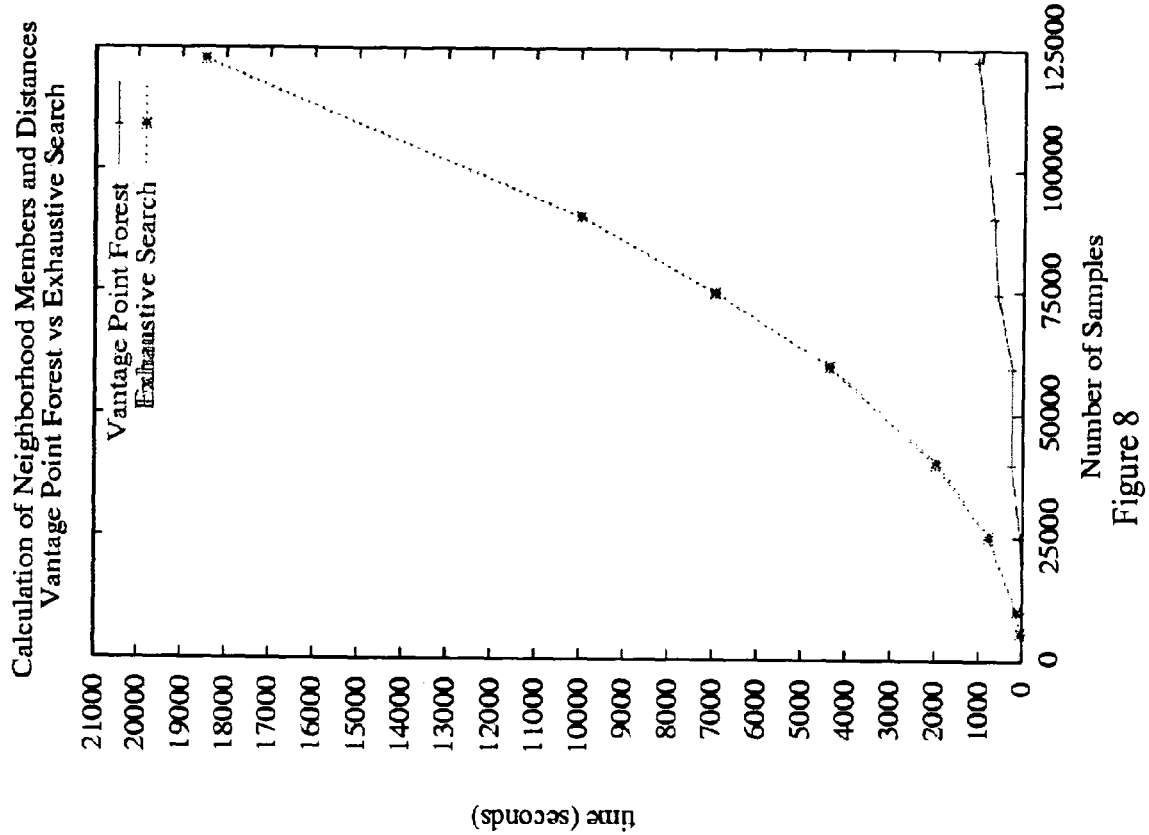
FIG. 8 is a graph comparing the processing time of the exhaustive neighborhood construction method, used in the ISOMAP prior art technique, to the Vantage Point Forest method according to the invention

Once a Vantage Point Forest is constructed, the query to find the neighbors of a particular sample vector presented to the Vantage Point Forest, proceeds by identify which hyperspherical shells of the top level trees in the Vantage Point Forest could be overlapped by a hypersphere of radius r about the query sample. Within these rings. The query then iteratively determines which overlapped shells are within less than r of their corresponding sub-vantage point. For those that are, the query determines which subset are actually within r of the query sample using the distance metric. Otherwise for shells that are overlapped and are further than r away from the corresponding sub-vantage point, the query determines which are overlapped at the next sub-level down. Thus, gathering of the samples in the neighborhood of the query sample thus occurs at each ending branch wherein only samples within r of the sub-vantage point reside and are potentially overlapped, with a small number of comparisons to actually be made between the samples in these shells and the query sample. FIG. 8 shows the typical of scaling of this Vantage Point Forest algorithm as the number of samples, N, in the hyperspectral subset are varied. For comparison the Figure also shows the $O(N^2)$ behavior of the exhaustive prior art algorithm which compares each query sample with all other samples to determine which are within the neighborhood of the query sample. Note that r was held fixed for all points on the curve in FIG. 8, so that for the Vantage Point Forest, the number of top level trees varied according to the particular random sample used to choose source nodes for each tree in the forest and with the density of points which changed as the data set size grew. Note that the Vantage Point Forest scales nearly linearly for some of its range, and certainly as no worse than:

$$O(m(r)\log(N)) \text{ with } m(r)<<N \tag{21}$$

over all of its range. The curve in FIG. 8 shows that this scales significantly better than the $O(N^2)$ behavior of the exhaustive prior art algorithm, making the processing of significantly larger subsets possible with ISOMAP and also the insertion into a large backbone scene subset that the "modified backbone" method described above also demands.

FASTPATCH: A New Method for Patching Isolated Points in Geodesic Distance Calculations of ISOMAP The original ISOMAP method had no self-consistent way of dealing with samples that remain disconnected from the geodesic distance graph after the Dijkstra algorithm has completed, accept possibly to ignore these samples all together. This is not an option for remote sensing applications which demand that the whole scene be processed. We have developed a patching algorithm which ensures that all points will be self-consistently connected to the geodesic distance graph at the conclusion of the use of Dijkstra Shortest Path algorithm. The method consists of inserting a previous step in which all samples are self-consistently attached to the first sample (the choice of source point is arbitrary). We achieve this via a recursive patching algorithm applied to the first point. In this method, we recursively connect the closest disconnected point not on the graph via one or more links and then call the Dijkstra shortest paths algorithm. We repeat this process until all points are connected to the first sample via shortest paths. Henceforth, we call this patching algorithm FASTPATCH. Note that in the Enhanced-ISOMAP method description that follows later, we can choose the first landmark to be the source point.

Landmarks ISOMAP

The solution to the second and third computational obstacles to effective use of the modified backbone method for obtaining manifold coordinates for the global scene requires us to obtain a solution with both better computational and memory requirements. An improvement to the processing speed and memory requirements associated with ISOMAP was described in V. de Silva, J. B. Tenenbaum, "Global versus local methods in nonlinear dimensionality reduction," in Advances in Neural Information Processing Systems 15. S. Becker, S., Thrun, S., and Obermayer, K. (eds). Cambridge, MIT Press, pp. 705-712, 2002.

The improved method chooses a set of "landmarks" (L-ISOMAP) from which all of the manifold geodesic distances $d_G$ are calculated. This forms an L×N geodesic distance matrix with L<<N. The symmetric submatrix $d_L$ of distances between landmarks is an L×L matrix whose eigenvalues and eigenvectors form the basis of the embedding of the manifold coordinates. Note that so long as the sampled landmarks span the space of the embedded manifold coordinates, the landmark distances are sufficient to calculate the manifold coordinate system. Note also that the eigenvector and eigenvalue problem of a large N×N matrix has been replaced by a smaller L×L problem. As before, the second order variation in $d_L$ is computed according to: $\tau_L = -(\frac{1}{2})$ $$(S_L)_{ij} = ((d_L)_{L_i L_j})^2 H^T S_L H, \qquad (22)$$

where $((d_L)_{L_i L_j})2$ is the set of geodesic distances between landmarks i and j, comprising an L×L matrix. For the $\tau$ in Equation (3) defined in original ISOMAP algorithm, iterative methods (G. Sleijpen, H. van der Vorst, "Jacobi-Davidson Methods", available online, http://www.cs.utk.edu/~dongarra/etemplates/node136.html through http://www.cs.utk.edu/~dongarra/etemplates/note147.html, 1994) were used to extract the eigenspectrum, however, with the L×L matrix $\tau_L$, more reliable exact eigensolvers can be employed. Once the most significant eigenvalues and eigenvectors of $\tau_L$ have been determined, the manifold coordinates of the remaining non-landmark samples can be computed by a simple linear transformation since their distances to the landmark positions are all known:

$$M(\vec{x}) = P_L * (\overline{\Delta} - \Delta) \qquad (23)$$

where $M(\vec{x})$ is the embedded manifold coordinate of spectral sample $\vec{x}$, $P_L$ is a matrix whose ith row is:

$$(P_L)_i = \frac{(\vec{v}_L)_i}{\sqrt{(\lambda_L)_i}} \qquad (24)$$

where $(\vec{v}_L)_i$ and $(\lambda_L)_i$ are the ith eigenvector and eigenvector of $\tau_L$, $\overline{\Delta}_i = E_{L_j}((d_L)_{L_i L_j})^2$ is the mean squared distance from the ith landmark to all other landmarks, and $\Delta_{ij} = ((d_L)_{L_i j})^2$ is the squared distance from sample j to the ith landmark.

Improvements to ISOMAP: The Enhanced ISOMAP Algorithm

Figure 9:
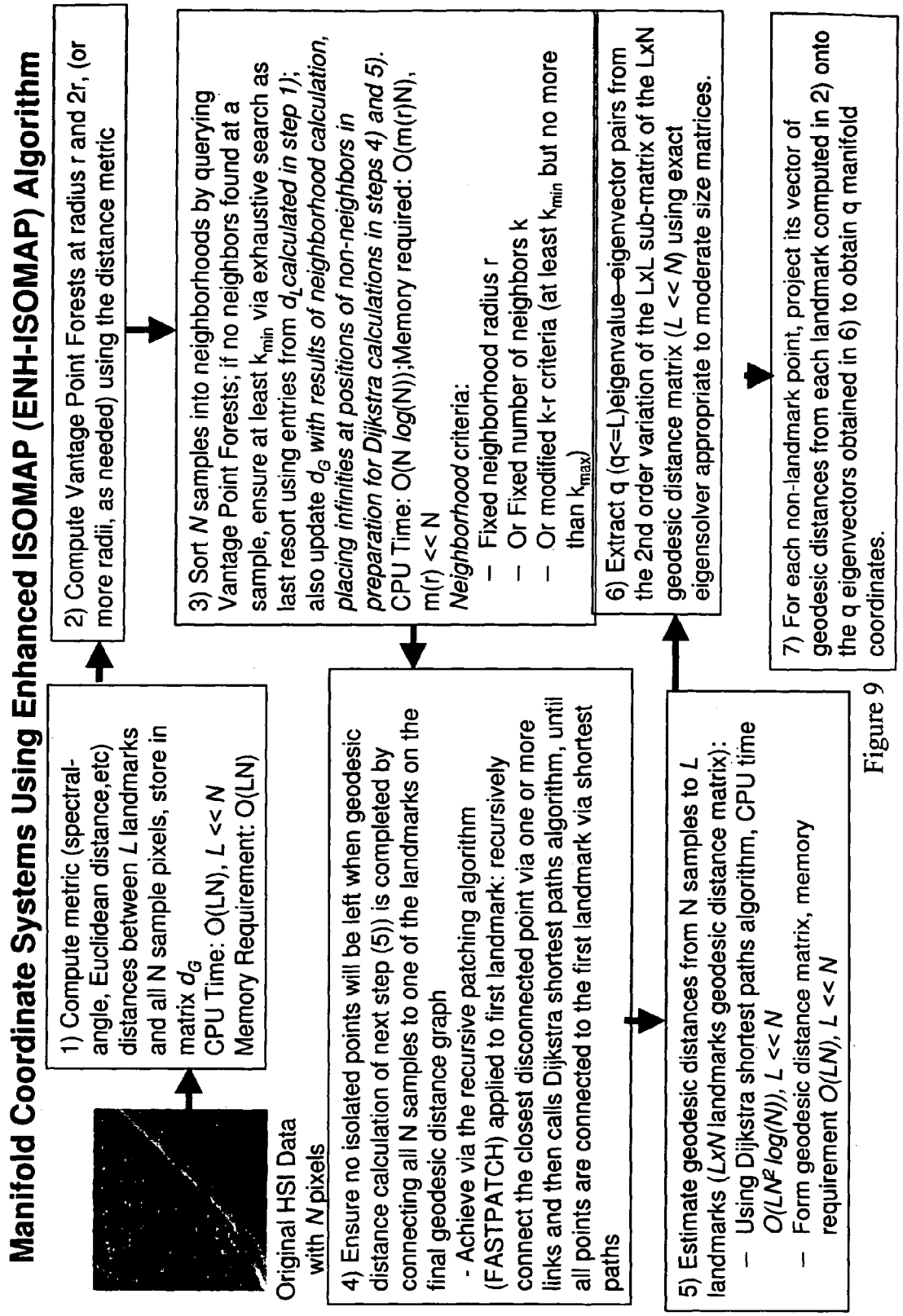
FIG. 9 is a flow chart of a processing technique according to the invention.

Four computational obstacles were cited in the previous section describing the modified backbone calculation of the global scene manifold coordinates. We developed or identified solutions to all of these with the use of Vantage Point Forests and Landmarks. Combining Vantage Point Forest, the use of Landmarks, and the FAST-PATCH algorithm defines a new method that we have developed which is an Enhanced ISOMAP method (ENH-ISOMAP). This is shown schematically in FIG. 9. In FIG. 9, seven steps are outlined which incorporate Vantage Point Forests for the fast calculation of neighborhoods, a modified neighborhood criterion combining features of two previously used neighborhood definitions: the absolute radius method and K closest neighbors, landmarks for the fast calculation of geodesic distances, and the FASTPATCH algorithm that we have developed to ensure no samples will be disconnected from the graph or omitted from the downstream processing.

Figure 10:
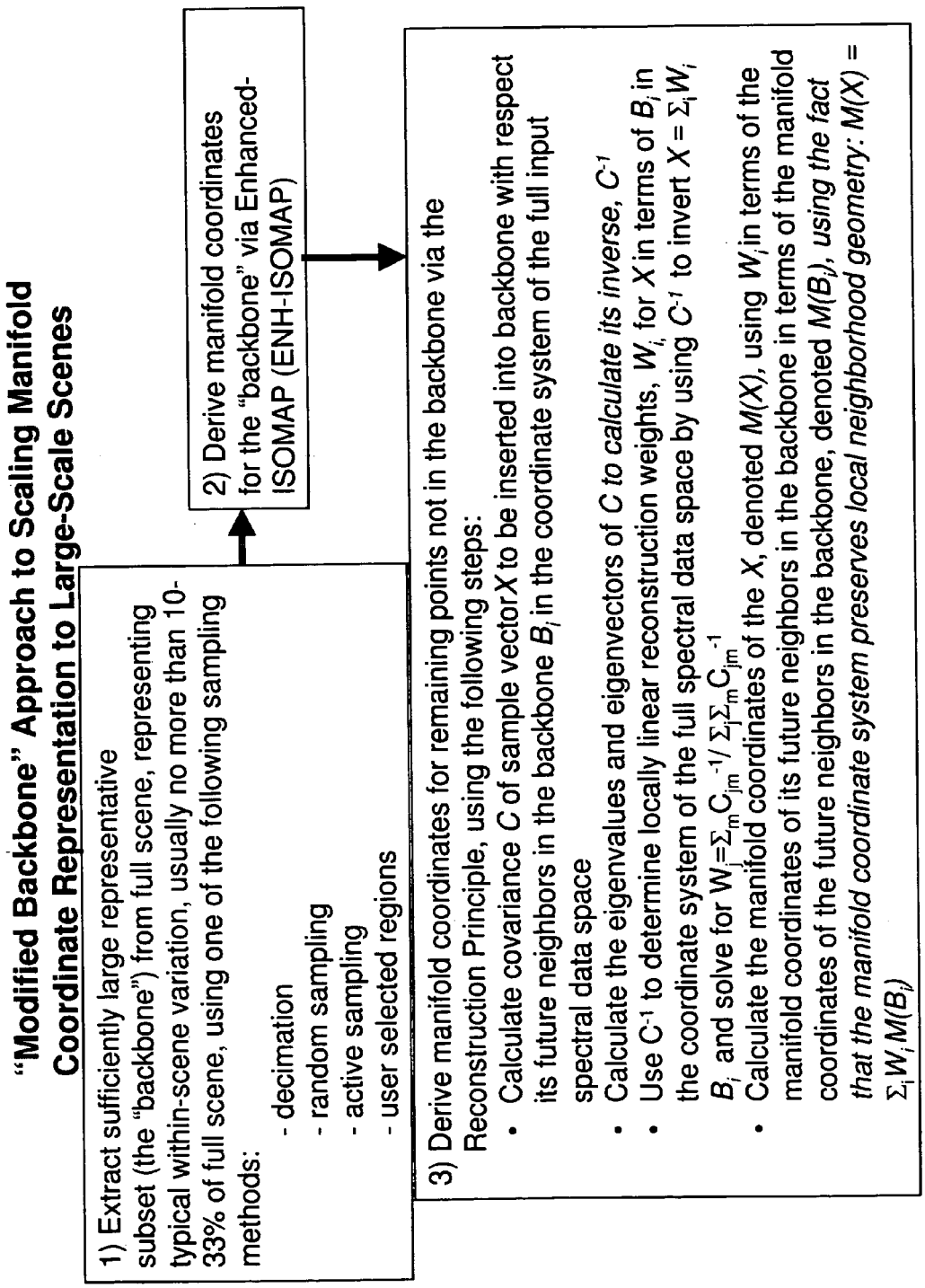
FIG. 10. is a flow chart of a processing technique according to the invention.

Putting it all Together: the Modified Backbone Approach to Constructing Manifold Coordinates for Large Hyperspectral Scenes We have now defined the critical steps necessary to achieve a solution to the problem of constructing the manifold coordinates for large hyperspectral scenes of $O(10^6)$ or greater. The approach is the Modified Backbone algorithm described above and shown schematically in FIG. 10. There are three critical steps: extraction of a sufficiently representative subset of the data (in practice 10-33% is sufficient), which can be quite large (~100,000-300,000 or greater) and requires the use of our new ENH-ISOMAP method to optimize the manifold coordinates rapidly and without exhausting typical computer memory. The third step inserts the samples not in the backbone into the backbone manifold coordinate system using the reconstruction principle first described in Equations (7) and (9) above with a somewhat different inversion scheme for the reconstruction weights based, in our case, calculating the inverse of Equation (7) by inverting the covariance matrix from its eigenvalues and eigenvectors (as described in Equations (16)-(20)), which may be obtained by any of several standard numerical methods such as the Singular Value Decomposition. The latter step of reconstruction also uses the fast Vantage Point Forest method, that we also incorporated into ENH-ISOMAP, to identify the neighbors used in the reconstruction when samples not in the backbone are inserted into the backbone manifold coordinate system.

Figure 11:
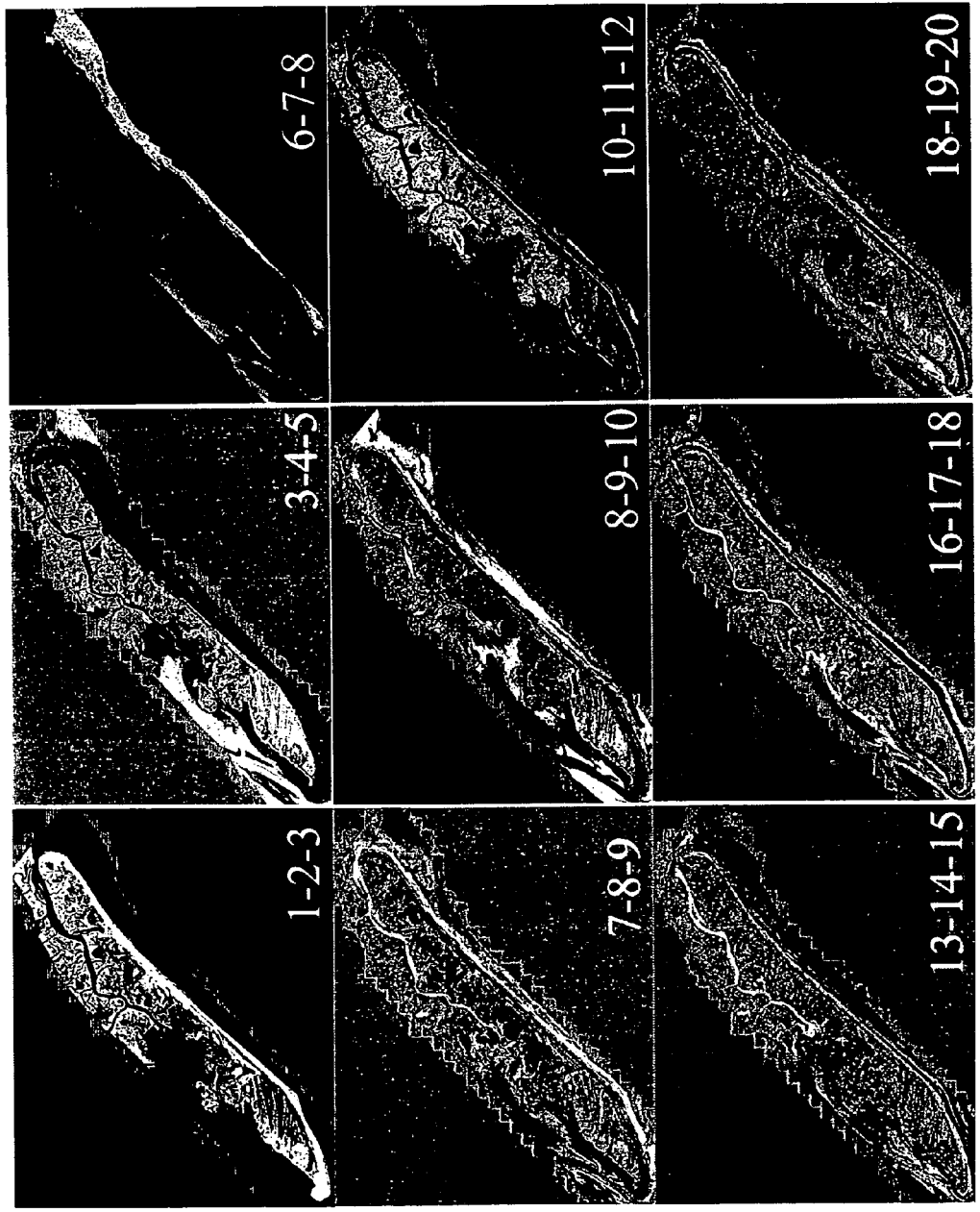
FIG. 11. shows the results obtained using the "modified backbone" method for obtaining manifold coordinates according to the invention.

An example of the modified backbone approach applied to a hyperspectral scene of a barrier island on Virginia's Eastern Shore is shown in FIG. 11. The full input hyperspectral scene contained 124 spectral channels, and there were ~1.8×10$^6$ spectral channels. Examples of RGB plots of combinations of the 20 manifold coordinates extracted in this example are shown in FIG. 11 for the full scene. In this case, the backbone manifold coordinates were constructed from a subset containing roughly 12 percent of the scene. There were 219,357 spectral sample vectors each of 124 dimensions in the backbone, and using ENH-ISOMAP on an Athlon64 3700+ 2.2 Ghz processor, the time to calculate the manifold coordinates was 40.4 minutes, roughly ⅔ of an hour. The time to insert the samples not in the backbone into the backbone by deriving their manifold coordinates was 3.75 hours again on the same computer with an Athlon64 3700+ 2.2 Ghz CPU. Thus the total processing time on a single CPU in this example was 4.4 hours. Note that the time to insert the samples into the backbone, i.e to derive their coordinates in the backbone manifold coordinate system would scale inversely with the number of processors, i.e. as $$\sim \frac{1}{N_{CPUs}},$$

since the backbone itself is not modified during the reconstruction. This would be achieved by sending copies of the backbone full spectral cube and its corresponding coordinates to each processor. Each processor would also receive only one subset of the full spectral data of the scene, disjoint from the other full spectral subsets received by the other CPU's and be responsible for reconstructing just that single subset in the backbone manifold coordinate system. Thus, for example, the 3.75 hours that it took to complete the calculation of the manifold coordinates on the non-backbone samples on a single CPU computer, would take only 3.5 minutes on a 64-processor multi-processor system with the same CPU speed, using all CPU's and ignoring the overhead needed to send copies of the various subsets to each processor and retrieve the results.

Figure 12:
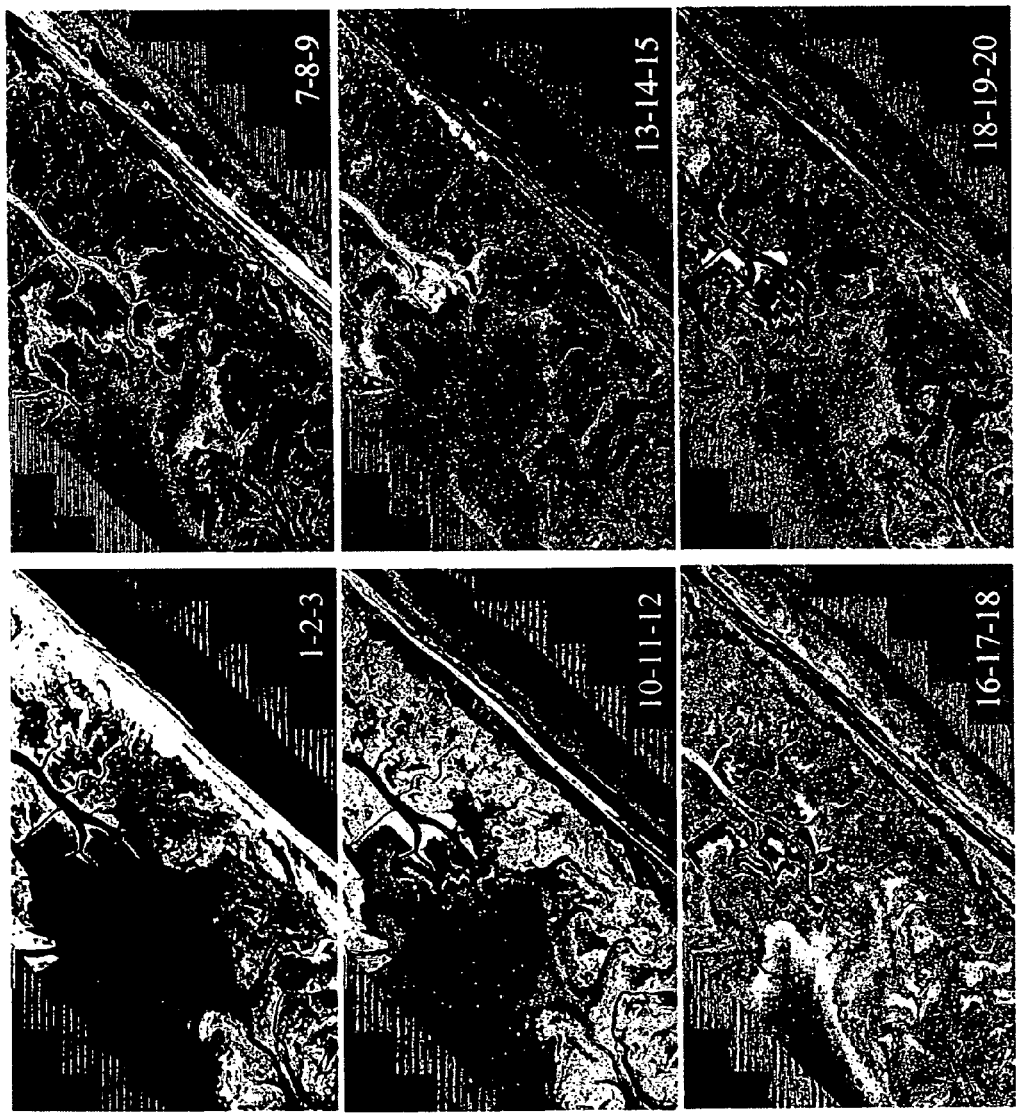
FIG. 12. shows the detail of a subset of the manifold coordinates shown in FIG. 11.

A detail from some of these manifold coordinate combinations is shown in FIG. 12, which shows a subset of the full scene near a delta at the inlet to a tidal creek, as well as the surrounding marsh, dunes, beach, and ocean and lagoonal waters. Both FIGS. 11 and 12 show the significant structure of the landscape revealed in the water, the land, and the land/water margin by the manifold coordinate representations.

It should also be noted that ENH-ISOMAP can be used with some of the earlier methods that we developed involving tiling. In the practice of the invention, deriving a manifold coordinate system from the geodesic distances between pixels of the underlying nonlinear hyperspectral data manifold provides a compact representation of the hyperspectral information. These new coordinates inherently incorporate the correlations between the various hyperspectral channels and, therefore, provide an efficient and convenient set of coordinates for image classification and target and anomaly detection.

Obviously many modifications and variations of the present invention are possible in the light of the above teachings. It is therefore to be understood that the scope of the invention should be determined by referring to the following appended claims.

We claim:

1. A method of optimizing a data classification for data representative of one or more physical parameters, comprising using a processor to perform the steps of:

obtaining a first data set including a plurality of said data representative of said one or more physical parameters;

dividing the data set into a plurality of data sets smaller than the first data set;

calculating a manifold coordinate system for each of said data sets in said plurality of data sets by computing a shortest geodesic distance on a manifold between each neighboring pair of data points in said plurality of data;

computing vantage point forests at a selected distance metric r;

sorting N samples into neighborhoods by querying said vantage point forests;

optionally expanding the neighborhood definition to ensure that at least $K_{min}$ neighbors in the neighborhood but no more than $K_{max}$ are assembled, and implementing said optional neighborhood definition with multiple vantage point forests at different values of r;

connecting substantially all N samples to a landmark on a final geodesic distance graph to substantially eliminate isolated data points;

estimating geodesic distances from the N samples to L landmarks to form an L×N landmarks geodesic distance matrix;

extracting q eigenvalue-eigenvector pairs from a second order variation of an L×L sub-matrix of the L×N landmarks geodesic distance matrix; and for each point that is not a landmark point projecting a vector of geodesic distances from each landmark computed in said vantage point forest computation step onto the q eigenvectors to obtain q manifold coordinates, thereby obtaining an optimized data classification set of the data representative of the physical parameters.

2. A method as in claim 1, wherein there are one or more pockets of data points isolated from a main distribution of the data points, and wherein said one or more isolated data points are also analyzed by determining a closest geodesic distance pair of said isolated data points, reconnecting said closest distance pair of isolated data points to the optimized data classification set, determining if any other isolated points can be reconnected through the new link to the main distribution and reconnecting same, and repeating the reconnection procedure for any remaining pocket of isolated data points, such that substantially all data points in said first data set are thereby processed.

3. A method as in claim 2, wherein the first data set is hyperspectral data.

4. A method as in claim 3, wherein the hyperspectral data is image data.

5. A method as in claim 4, wherein the image data is topographical images.

6. A method of optimizing a data classification for data representative of one or more physical parameters, comprising using a processor to perform the steps of:

obtaining a first backbone data set extracted from a larger full scene data set including a plurality of data in said first data set representative of a typical within-scene variation and representative of said one or more physical parameters;

dividing the remaining data not in the backbone into a set of smaller subsets;

calculating a manifold coordinate system for each of said subset data sets in said plurality of data sets by:

computing a shortest geodesic distance on a manifold between each neighboring pair of data points in said plurality of data;

computing vantage point forests at a selected distance metric r in said backbone;

sorting N samples into neighborhoods in said plurality of data sets by querying said vantage point forests;

optionally expanding the neighborhood definition in said plurality of data sets to ensure that at least $K_{min}$ neighbors in the neighborhood but no more than $K_{max}$ are assembled, and implementing said optional neighborhood definition with multiple vantage point forests at different values of r;

connecting substantially all N samples to a landmark on a final geodesic distance graph to substantially eliminate isolated data points in said plurality of data sets;

estimating geodesic distances from the N samples to L landmarks to form an L×N landmarks geodesic distance matrix for said plurality of data sets;

extracting q eigenvalue-eigenvector pairs from a second order variation of an L×L sub-matrix of the L×N landmarks geodesic distance matrix for said plurality of data sets; and for each point that is not a landmark point in said data sets, projecting a vector of geodesic distances from each landmark computed in said vantage point forest computation step onto the q eigenvectors to obtain q manifold coordinates, thereby obtaining an optimized data classification set of the data representative of the physical parameters;

calculating a manifold coordinate system for said backbone by:

computing a shortest geodesic distance on a manifold between each neighboring pair of data points in said plurality of data;

computing vantage point forests at a selected distance metric r in said backbone;

sorting N samples into neighborhoods in said backbone by querying said vantage point forests;

optionally expanding the neighborhood definition in said backbone to ensure that at least $K_{min}$ neighbors in the neighborhood but no more than $K_{max}$ are assembled, and implementing said optional neighborhood definition with multiple vantage point forests at different values of r;

connecting substantially all N samples to a landmark on a final geodesic distance graph to substantially eliminate isolated data points in said backbone;

estimating geodesic distances from the N samples to L landmarks to form an L×N landmarks geodesic distance matrix for said backbone;

extracting q eigenvalue-eigenvector pairs from a second order variation of an L×L sub-matrix of the L×N landmarks geodesic distance matrix for said backbone; and for each point that is not a landmark point in said backbone, projecting a vector of geodesic distances from each landmark computed in said vantage point forest computation step onto the q eigenvectors to obtain q manifold coordinates, thereby obtaining an optimized data classification set of the data representative of the physical parameters; and deriving manifold coordinates for remaining points not in the backbone data set via a reconstruction principle to thereby obtain an optimized data classification set of the data representative of the physical parameters.

7. A method as in claim 6, wherein there are one or more pockets of data points isolated from a main distribution of the data points, and wherein said one or more isolated data points are also analyzed by determining a closest geodesic distance pair of said isolated data points, reconnecting said closest distance pair of isolated data points to the optimized data classification set, determining if any other isolated points can be reconnected through the new link to the main distribution and reconnecting same, and repeating the reconnection procedure for any remaining pocket of isolated data points, such that substantially all data points in said first data set are thereby processed.

8. A method as in claim 7, wherein the first data set is hyperspectral data.

9. A method as in claim 8, wherein the hyperspectral data is image data.

10. A method as in claim 9, wherein the image data is topographical images.

11. A method of optimizing a data classification for data representative of one or more physical parameters, comprising using a processor to perform the steps of:

obtaining a first backbone data set extracted from a larger full scene data set including a plurality of data in said first data set representative of a typical within-scene variation and representative of said one or more physical parameters;

calculating a manifold coordinate system for said backbone by:

computing a shortest geodesic distance on a manifold between each neighboring pair of data points in said plurality of data;

computing vantage point forests at a selected distance metric r in said backbone;

sorting N samples into neighborhoods in said backbone by querying said vantage point forests;

optionally expanding the neighborhood definition in said backbone to ensure that at least $K_{min}$ neighbors in the neighborhood but no more than $K_{max}$ are assembled, and implementing said optional neighborhood definition with multiple vantage point forests at different values of r;

connecting substantially all N samples to a landmark on a final geodesic distance graph to substantially eliminate isolated data points in said backbone;

estimating geodesic distances from the N samples to L landmarks to form an L×N landmarks geodesic distance matrix for said backbone;

extracting q eigenvalue-eigenvector pairs from a second order variation of an L×L sub-matrix of the L×N landmarks geodesic distance matrix for said backbone; and for each point that is not a landmark point in said backbone, projecting a vector of geodesic distances from each landmark computed in said vantage point forest computation step onto the q eigenvectors to obtain q manifold coordinates, thereby obtaining an optimized data classification set of the data representative of the physical parameters; and deriving manifold coordinates for remaining points not in the backbone data set via a reconstruction principle to thereby obtain an optimized data classification set of the data representative of the physical parameters.

12. A method as in claim 11, wherein the reconstruction principle comprises:

calculating a covariance C of a sample vector X for insertion into the backbone data set in the vicinity of backbone neighbors $B_i$ identified in the backbone data set by queries to a vantage point forest or set of forests at one or more radii as necessary to perform with a sufficient number of neighbors to perform said reconstruction, in a coordinate system of the backbone data set, and by extension, when all points are finally included, the coordinate system of the larger full scene data set;

calculating an inverse of C in terms of the eigenvectors and eigenvalues of C, such as in a singular value decomposition (SVD) of C, or other similar standard numerical method for obtaining its inverse;

applying the inverse to determine locally linear reconstruction weights $W_i$ for X in terms of $B_i$ in the coordinate system of the larger full scene data set; and calculating the manifold coordinates of X.

13. A method as in claim 12, wherein there are one or more pockets of data points isolated from a main distribution of the data points, and wherein said one or more isolated data points are also analyzed by determining a closest geodesic distance pair of said isolated data points, reconnecting said closest distance pair of isolated data points to the optimized data classification set, determining if any other isolated points can be reconnected through the new link to the main distribution and reconnecting same, and repeating the reconnection procedure for any remaining pocket of isolated data points, such that substantially all data points in said first data set are thereby processed.

14. A method as in claim 13, wherein the first data set is hyperspectral data.

15. A method as in claim 14, wherein the hyperspectral data is image data.

16. A method as in claim 15, wherein the image data is topographical images.

17. A method of optimizing a data classification for data representative of one or more physical parameters, comprising using a processor to perform the steps of:

obtaining a first data set including a plurality of said data representative of said one or more physical parameters;

dividing the data set into a plurality of data sets smaller than the first data set;

calculating a manifold coordinate system for each of said data sets in said plurality of data sets by computing a shortest geodesic distance on a manifold between each neighboring pair of data points in said plurality of data;

computing vantage point forests at a selected distance metric r;

sorting N samples into neighborhoods by querying said vantage point forests;

optionally expanding the neighborhood definition to ensure that at least $K_{min}$ neighbors in the neighborhood but no more than $K_{max}$ are assembled, and implementing said optional neighborhood definition with multiple vantage point forests at different values of r;

connecting substantially all N samples to a landmark on a final geodesic distance graph to substantially eliminate isolated data points;

estimating geodesic distances from the N samples to L landmarks to form an L×N landmarks geodesic distance matrix;

extracting q eigenvalue-eigenvector pairs from a second order variation of an L×L sub-matrix of the L×N landmarks geodesic distance matrix;

for each point that is not a landmark point projecting a vector of geodesic distances from each landmark computed in said vantage point forest computation step onto the q eigenvectors to obtain q manifold coordinates, thereby obtaining an optimized data classification set of the data representative of the physical parameters;

selecting a tile as a target tile for the global manifold coordinate system of the scene;

aligning the manifold coordinate systems of all remaining tiles to that of the target tile using a pseudoinverse transformation, constructed by:

reconstructing the input spectra of a subset of random or known samples drawn from each remaining tile in terms of neighbors in the target tile identified from queries to vantage point forests of the target tile; and applying the reconstruction weights to obtain the corresponding manifold spectrum of the random or known sample in the manifold coordinate system of the target tile, thereby obtaining a global manifold coordinate system for the entire data set.

18. A method as in claim 17, wherein the reconstruction principle comprises:

calculating a covariance C of a sample vector X for insertion into the target tile in the vicinity of neighbors identified in the target tile by queries to a vantage point forest or set of forests at one or more radii as necessary to perform with a sufficient number of neighbors to perform said reconstruction, in a coordinate system of the target tile data set, and by extension, when all points are finally included, the coordinate system of the larger full scene data set;

calculating an inverse of C in terms of the eigenvectors and eigenvalues of C;

applying the inverse to determine locally linear reconstruction weights $W_i$ for X in terms of the neighbors in the target tile in the coordinate system of the larger full scene data set; and calculating the manifold coordinates of X.

19. A method as in claim 18, wherein there are one or more pockets of data points isolated from a main distribution of the data points, and wherein said one or more isolated data points are also analyzed by determining a closest geodesic distance pair of said isolated data points, reconnecting said closest distance pair of isolated data points to the optimized data classification set, determining if any other isolated points can be reconnected through the new link to the main distribution and reconnecting same, and repeating the reconnection procedure for any remaining pocket of isolated data points, such that substantially all data points in said first data set are thereby processed.

20. A method as in claim 19, wherein the first data set is hyperspectral data.

21. A method as in claim 20, wherein the hyperspectral data is image data.

22. A method as in claim 21, wherein the image data is topographical images.

* * * * *